(12) United States Patent
Hancock et al.

(10) Patent No.: US 10,427,957 B2
(45) Date of Patent: Oct. 1, 2019

(54) OSMOTIC SEPARATION SYSTEMS AND METHODS

(71) Applicant: OASYS WATER LLC, Dover, DE (US)

(72) Inventors: Nathan T. Hancock, Boston, MA (US); Marek S. Nowosielski-Slepowron, Newton, MA (US)

(73) Assignee: OASYS WATER LLC, Dover, DE (US)

( * ) Notice: Subject to any disclaimer, the term of this patent is extended or adjusted under 35 U.S.C. 154(b) by 0 days.

(21) Appl. No.: 15/650,119

(22) Filed: Jul. 14, 2017

(65) Prior Publication Data

US 2018/0155218 A1    Jun. 7, 2018

Related U.S. Application Data

(63) Continuation of application No. 14/173,553, filed on Feb. 5, 2014, now abandoned.
(Continued)

(51) Int. Cl.
*B01D 61/58* (2006.01)
*C02F 1/44* (2006.01)
(Continued)

(52) U.S. Cl.
CPC ............ *C02F 1/445* (2013.01); *B01D 61/002* (2013.01); *B01D 61/58* (2013.01); *B01D 65/02* (2013.01); *B01D 61/025* (2013.01); *B01D 2321/04* (2013.01); *B01D 2321/06* (2013.01); *B01D 2321/12* (2013.01); *C02F 1/441* (2013.01); *C02F 1/442* (2013.01); *C02F 1/444* (2013.01);
(Continued)

(58) Field of Classification Search
CPC ............... B01D 61/002; B01D 61/005; B01D 2317/02; B01D 2317/022; B01D 2317/025; B01D 27/146; B01D 29/0052; B01D 29/56; C02F 1/445
See application file for complete search history.

(56) References Cited

U.S. PATENT DOCUMENTS 3,470,093 A    9/1969  Johanson
5,620,605 A    4/1997  M.o slashed.ller
(Continued)

FOREIGN PATENT DOCUMENTS

JP    WO2012023469    *  2/2012
JP       2013158732 A     8/2013
(Continued)

OTHER PUBLICATIONS

Hancock et al., "A Comparative Life Cycle Assessment of Hybrid Osmotic Dilution Desalination and Established Seawater Desalination and Wastewater Reclamation Processes", Water Research, vol. 46, pp. 1145-1154 (2012).
(Continued)

*Primary Examiner* — Pranav N Patel
(74) *Attorney, Agent, or Firm* — Leason Ellis LLP

(57) ABSTRACT

Separation processes using osmotically driven membrane systems are disclosed generally involving the extraction of solvent from a first solution to concentrate solute by using a second concentrated solution to draw the solvent from the first solution across a semi-permeable membrane.

7 Claims, 12 Drawing Sheets

Related U.S. Application Data

(60) Provisional application No. 61/904,882, filed on Nov. 15, 2013, provisional application No. 61/900,095, filed on Nov. 5, 2013, provisional application No. 61/887,076, filed on Oct. 4, 2013, provisional application No. 61/762,385, filed on Feb. 8, 2013.

(51) Int. Cl.
  *B01D 61/00* (2006.01)
  *B01D 65/02* (2006.01)
  *B01D 61/02* (2006.01)

(52) U.S. Cl.
  CPC .... *C02F 2209/005* (2013.01); *C02F 2301/08* (2013.01)

(56) References Cited

U.S. PATENT DOCUMENTS

| | | | |
|---|---|---|---|
| 5,695,643 A | 12/1997 | Brandt et al. | |
| 6,375,848 B1 | 4/2002 | Cote et al. | |
| 6,391,205 B1 | 5/2002 | McGinnis | |
| 7,025,885 B2 | 4/2006 | Cote et al. | |
| 7,455,109 B2 | 11/2008 | Collins | |
| 7,591,309 B2 | 9/2009 | Minnich et al. | |
| 7,823,396 B2 | 11/2010 | Al-Mayahi et al. | |
| 7,879,243 B2 | 2/2011 | Al-Mayahi et al. | |
| 8,002,989 B2 | 8/2011 | McGinnis | |
| 8,491,795 B2 | 7/2013 | Chen | |
| 9,039,899 B2 | 5/2015 | McGinnis | |
| 9,044,711 B2 | 6/2015 | McGinnis | |
| 2006/0011544 A1* | 1/2006 | Sharma | B01D 61/002 210/640 |
| 2006/0144789 A1 | 7/2006 | Cath et al. | |
| 2006/0157410 A1 | 7/2006 | Hassan | |
| 2007/0246426 A1 | 10/2007 | Collins | |
| 2008/0307968 A1 | 12/2008 | Kang et al. | |
| 2009/0008330 A1 | 1/2009 | Thorsen et al. | |
| 2010/0024423 A1 | 2/2010 | McGinnis et al. | |
| 2010/0155329 A1* | 6/2010 | Iyer | B01D 61/002 210/636 |
| 2010/0183903 A1 | 7/2010 | McGinnis et al. | |
| 2010/0192575 A1* | 8/2010 | Al-Mayahi | B01D 61/002 60/671 |
| 2010/0206743 A1 | 8/2010 | Sharif | |
| 2010/0224476 A1 | 9/2010 | Cath et al. | |
| 2011/0042306 A1 | 2/2011 | Ito et al. | |
| 2011/0044824 A1* | 2/2011 | Kelada | F03G 7/005 417/53 |
| 2011/0062079 A1 | 3/2011 | Daines-Martinez et al. | |
| 2011/0155666 A1 | 6/2011 | Prakash et al. | |
| 2011/0168381 A1 | 7/2011 | Herron et al. | |
| 2011/0203994 A1 | 8/2011 | McGinnis et al. | |
| 2011/0272355 A1 | 11/2011 | Rajagopalan et al. | |
| 2012/0012511 A1 | 1/2012 | Kim et al. | |
| 2012/0067819 A1 | 3/2012 | McGinnis | |
| 2012/0174639 A1 | 7/2012 | Herron | |
| 2012/0234664 A1 | 9/2012 | Nicoll | |
| 2012/0267297 A1 | 10/2012 | Iyer | |
| 2012/0267306 A1 | 10/2012 | McGinnis et al. | |
| 2012/0267307 A1 | 10/2012 | McGinnis | |
| 2012/0273417 A1 | 11/2012 | McGinnis et al. | |
| 2012/0279921 A1 | 11/2012 | Nicoll | |
| 2012/0285886 A1 | 11/2012 | Liberman | |
| 2013/0001162 A1 | 1/2013 | Yangali-Quintanilla et al. | |
| 2013/0140233 A1* | 6/2013 | Taniguchi | B01D 61/022 210/637 |
| 2013/0186822 A1 | 7/2013 | Herron et al. | |
| 2013/0213893 A1 | 8/2013 | Posa | |
| 2013/0220581 A1 | 8/2013 | Herron et al. | |
| 2014/0116943 A1 | 5/2014 | Nakano | |
| 2014/0124443 A1 | 5/2014 | McGinnis | |
| 2014/0138313 A1 | 5/2014 | Sato | |
| 2014/0246372 A1 | 9/2014 | Musale et al. | |
| 2015/0014248 A1 | 1/2015 | Herron et al. | |
| 2015/0353397 A1 | 12/2015 | Cath et al. | |
| 2015/0367285 A1 | 12/2015 | Chang et al. | |

FOREIGN PATENT DOCUMENTS

| | | |
|---|---|---|
| JP | 2013202456 A | 10/2013 |
| JP | 5433633 B2 | 3/2014 |
| JP | 2014065008 A | 4/2014 |
| KR | 2013-0103996 A | 9/2013 |
| NL | 1035431 A1 | 12/2008 |
| WO | 199323150 A1 | 11/1993 |
| WO | 2010067063 A1 | 6/2010 |
| WO | 2010067065 A1 | 6/2010 |
| WO | 2011004303 A1 | 1/2011 |
| WO | WO2011053794 * | 5/2011 |
| WO | 2011064731 A1 | 6/2011 |
| WO | 2011086346 A1 | 7/2011 |
| WO | 2012062392 A1 | 5/2012 |
| WO | 2012102677 A1 | 8/2012 |
| WO | 2012/120912 A1 | 9/2012 |
| WO | 2012138502 A1 | 10/2012 |
| WO | 2012138793 A1 | 10/2012 |
| WO | 2014078415 A1 | 5/2014 |
| WO | 2014089228 A2 | 6/2014 |
| WO | 2014110429 A1 | 7/2014 |
| WO | 20140124443 A1 | 8/2014 |
| WO | 2014144704 A1 | 9/2014 |
| WO | 2014144778 A1 | 9/2014 |

OTHER PUBLICATIONS

Zhao et al., "Recent Developments in Forward Osmosis: Opportunities and Challenges", Journal of Membrane Science, vol. 398, pp. 1-21 (2012).

Eastern Municipal Water Disctrict Carollo Engineers. Evaluation and selection of available processes for a zero-liquid discharge system for the Perris, California ground water basin. U.S. Department of the Interior (Apr. 2008), 198 pages.

* cited by examiner

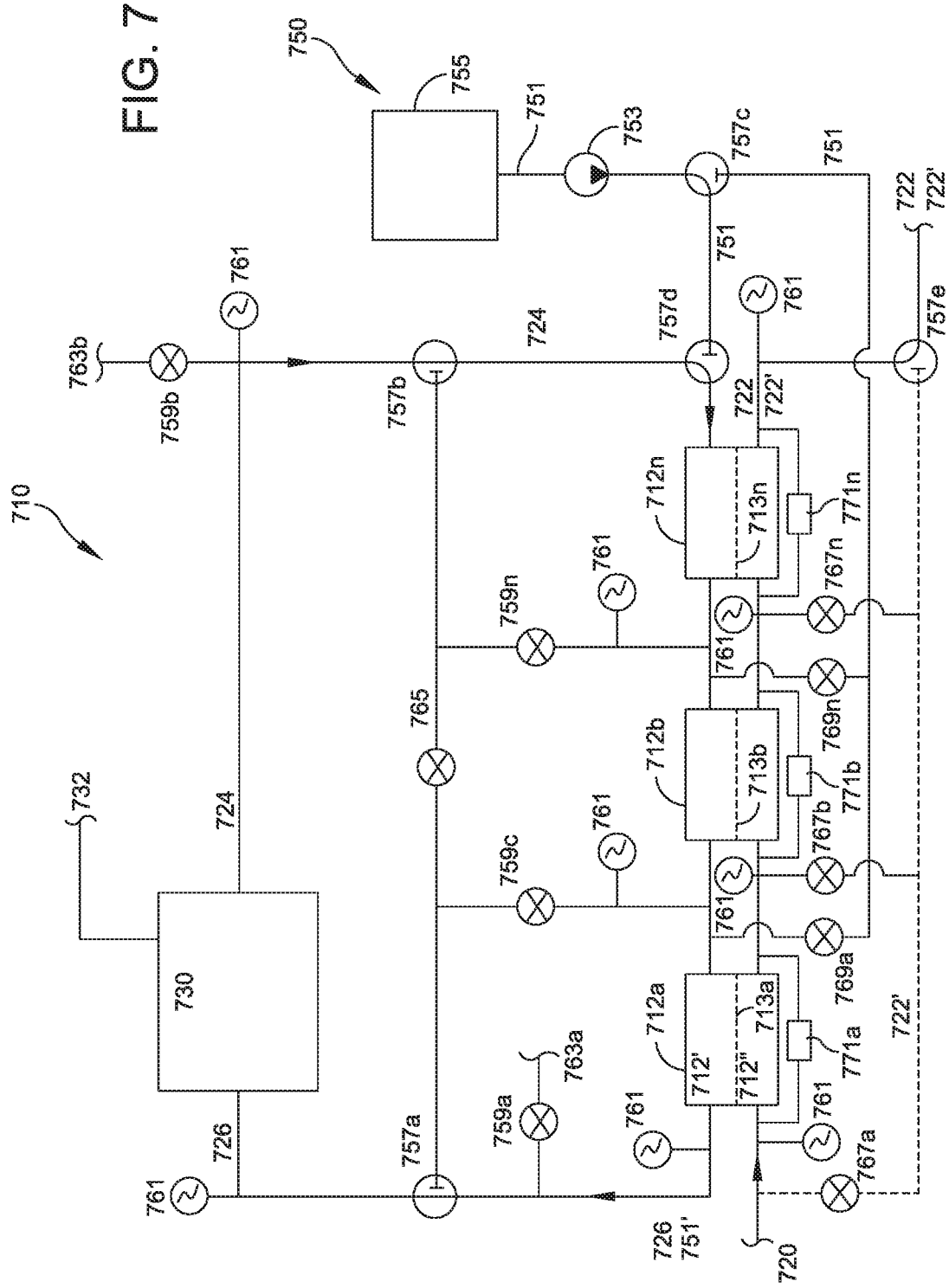

OSMOTIC SEPARATION SYSTEMS AND METHODS

CROSS-REFERENCE TO RELATED APPLICATIONS

This application is a continuation of U.S. patent application Ser. No. 14/173,553, filed Feb. 5, 2014, which claims priority to and the benefit of U.S. Provisional Patent Application No. 61/762,385, filed Feb. 8, 2013; 61/887,076, filed Oct. 4, 2013; 61/900,095, filed Nov. 5, 2013; and 61/904,882, filed Nov. 15, 2013; the entire disclosures of which are hereby incorporated by reference herein in their entireties.

FIELD OF THE TECHNOLOGY

One or more aspects relate generally to osmotic separation. More particularly, one or more aspects involve use of osmotically driven membrane processes, such as forward osmosis, to separate solutes from aqueous solutions.

BACKGROUND

Forward osmosis has been used for desalination. In general, a forward osmosis desalination process involves a container having two chambers separated by a semi-permeable membrane. One chamber contains seawater. The other chamber contains a concentrated solution that generates a concentration gradient between the seawater and the concentrated solution. This gradient draws water from the seawater across the membrane, which selectively permits water to pass, but not salts, into the concentrated solution. Gradually, the water entering the concentrated solution dilutes the solution. The solutes are then removed from the dilute solution to generate potable water.

There are a variety of issues that can arise with respect to the feed solutions supplied to the forward osmosis process. For example, the feed solution can have a sufficiently low salinity that the concentrated draw solution on the opposite side of the membrane becomes highly diluted by the process, thereby complicating the recovery/regeneration of the draw solution. The condition of the feed solution may also require the use of certain pretreatment processes to make it usable in the forward osmosis process. Most pretreatment processes make the overall process more costly by, for example, requiring the use of additional energy or chemicals (e.g., lime softening) or further steps (e.g., regeneration of an ion exchange resin). Additionally, there can be disposal issues with the concentrated feed solution after forward osmosis processing. For example, highly concentrated brine raises environmental disposal issues, e.g., discharging concentrated brine into a body of water negatively impacts the local ecosystem. While there are some solutions for these problems, they tend to be expensive and/or add undue complexity to the basic forward osmosis process.

SUMMARY

Aspects of the invention relate generally to osmotically driven membrane systems and methods, including forward osmosis separation (FO), direct osmotic concentration (DOC), pressure-assisted forward osmosis (PAFO), and pressure retarded osmosis (PRO).

In one aspect, the invention relates to a system (and its corresponding method steps) for the osmotic extraction of a solvent from a first solution. The system includes a plurality of forward osmosis units, each having a first chamber having an inlet fluidly coupled to a source of the first solution, a second chamber having an inlet fluidly coupled to a source of a concentrated draw solution, and a semi-permeable membrane system separating the first chamber from the second chamber and configured for osmotically separating the solvent from the first solution, thereby forming a second solution in the first chamber and a dilute draw solution in the second chamber. The system also includes a separation system in fluid communication with the plurality of forward osmosis units and configured to separate the dilute draw solution into the concentrated draw solution and a solvent stream, and a flushing system in fluid communication with the plurality of forward osmosis units and the separation system. The flushing system includes a source of flushing solution (e.g., the aforementioned solvent stream), a fluid transfer device in fluid communication with the source of flushing solution and at least one of the plurality of forward osmosis units, a valve arrangement in fluid communication with the source of flushing solution, the fluid transfer device, and the at least one forward osmosis unit, and a control system in communication with at least one of the source of flushing solution, the fluid transfer device, or the valve arrangement. The control system is configured to operatively connect the source of flushing solution with the at least one forward osmosis unit via the fluid transfer device and the valve arrangement.

In various embodiments of the foregoing aspect, the valve arrangement includes a plurality of valves and at least one sensor, where the at least one sensor is configured to generate a signal based on at least one operating characteristic of the system. The control system includes a set of instructions configured to control the flushing system according to at least one of a predetermined protocol or as triggered by one or more signals generated by the at least on sensor. The control system can actuate one or more of the plurality of valves to direct a flow of flushing solution from the source of flushing solution through the second chamber of the at least one forward osmosis unit. In some embodiments, the control system directs the flushing solution to each of the plurality of forward osmosis units in series.

In another aspect, the invention relates to an alternative system and method for the osmotic extraction of a solvent from a first solution. The system includes a forward osmosis unit having a first chamber having an inlet fluidly coupled to a source of the first solution, a second chamber having an inlet fluidly coupled to a source of a concentrated draw solution, and a semi-permeable membrane system separating the first chamber from the second chamber and configured for osmotically separating the solvent from the first solution, thereby forming a second solution in the first chamber and a dilute draw solution in the second chamber. The system also includes a separation system in fluid communication with the forward osmosis unit and configured to separate the dilute draw solution into the concentrated draw solution and a solvent stream. The separation system includes a filtration unit, a reverse osmosis unit, and a by-pass circuit all in fluid communication with the forward osmosis unit. The filtration unit includes a first chamber having an inlet fluidly coupled to the second chamber of the forward osmosis unit for receiving at least a first portion of the dilute draw solution, a second chamber having an outlet fluidly coupled to the reverse osmosis unit for transferring a less dilute draw solution thereto, and a filtration membrane separating the first chamber from the second chamber and configured for partially removing solutes from the dilute draw solution, thereby forming the less dilute draw solution in the second chamber by passing the remaining dilute draw solution there through. The removed solutes are returned to the first chamber of the forward osmosis unit via an outlet from the first chamber of the filtration unit. The reverse osmosis unit includes a first chamber having an inlet fluidly coupled to the second chamber of the forward osmosis unit for receiving at least a second portion of the dilute draw solution and an outlet fluidly coupled to the second chamber of the forward osmosis unit for introducing the concentrated draw solution thereto, a semi-permeable membrane coupled to the first chamber, and a second chamber coupled to the semi-permeable membrane and configured for receiving a solvent fluxed through the membrane, thereby leaving the concentrated draw solution in the first chamber for transfer to the forward osmosis unit. The by-pass circuit is configured to selectively direct the first and second portions of the dilute draw solution to the filtration unit and the reverse osmosis unit. Generally, the by-pass circuit includes any necessary valves, sensors, controls, etc. for regulating (and in some embodiments also monitoring) the portions of dilute draw solution directed to either unit. Depending on the particular application of the system or method (e.g., feed/draw chemistries, operating parameters, and ambient conditions), anywhere from 0-100% of the dilute draw solution can be directed to either the filtration unit or the reverse osmosis unit.

In various embodiments of the foregoing aspect, the forward osmosis unit includes a plurality of forward osmosis units, where each includes a first chamber having an inlet fluidly coupled to the source of the first solution, a second chamber having an inlet fluidly coupled to the source of a concentrated draw solution, and a semi-permeable membrane system separating the first chamber from the second chamber and configured for osmotically separating the solvent from the first solution, thereby forming the second solution in the first chambers and the dilute draw solution in the second chambers. In addition, the portions of the dilute draw solution can be delivered to the filtration unit and/or the reverse osmosis unit under pressure, for example, via a pump or other pressure exchange device. In some embodiments, the separation system further includes means for introducing an additive to the first portion of the dilute draw solution, the second portion of the dilute draw solution, or both. The means for introducing the additive can include a valve and port arrangement for directly introducing the additive to a fluid conveying line or one of the units. Additionally, the means can include a storage and/or mixing tank along with a metering device or the like for storing and/or delivering the additive to the system. In one or more embodiments of the system, the separation system can include a thermal recovery unit in fluid communication with the outlet of the first chamber of the reverse osmosis unit for receiving the concentrated draw solution therefrom and the second chamber of the forward osmosis unit for introducing a further concentrated draw solution thereto.

In yet another aspect, the invention relates to systems and methods for extracting a solvent from a first solution. One such system includes a forward osmosis unit, a reverse osmosis unit, and a separation system. The forward osmosis unit includes a first chamber having an inlet fluidly coupled to a source of the first solution, a second chamber having an inlet fluidly coupled to a source of a concentrated draw solution, and a semi-permeable membrane system separating the first chamber from the second chamber. The semi-permeable membrane is configured for osmotically separating the solvent from the first solution, thereby forming a second solution in the first chamber (or on one side of the membrane) and a dilute draw solution in the second chamber (or opposite side of the membrane). The reverse osmosis unit is fluidly coupled to an outlet of the second chamber of the forward osmosis unit and includes a first chamber in fluid communication with the second chamber of the forward osmosis unit and configured for receiving the dilute draw solution under pressure, a semi-permeable membrane coupled to the first chamber, and a second chamber coupled to the semi-permeable membrane and configured for receiving a solvent fluxed through the membrane, thereby leaving a less dilute draw solution in the first chamber of the reverse osmosis unit. The separation system is in fluid communication with the forward osmosis unit and the reverse osmosis unit and is configured to separate the dilute or less dilute draw solution into the concentrated draw solution and a solvent stream. The separation system includes an inlet fluidly coupled to an outlet of the first chamber of the reverse osmosis unit for receiving the less dilute draw solution therefrom and an outlet fluidly coupled to the second chamber of the forward osmosis unit for introducing the concentrated draw solution to the forward osmosis unit.

In various embodiments of the foregoing aspect, the system includes a pressure exchanger disposed between and in fluid communication with the second chamber of the forward osmosis unit and the first chamber of the reverse osmosis unit. The pressure exchanger is configured to increase the pressure of the dilute draw solution introduced to the first chamber of the reverse osmosis unit. The system can also include a by-pass system in fluid communication with the first chamber of the reverse osmosis unit and the second chamber of the forward osmosis unit for directing the less dilute draw solution back to the forward osmosis unit. In one or more embodiments, the system includes a porting system (e.g., an inlet or outlet and necessary valving) for introducing (or removing) a substance to (from) the dilute draw solution or other associated stream. The system can also include at least one treatment system in fluid communication with at least one of the forward osmosis unit, the reverse osmosis unit, or the separation system. The at least one treatment system can be configured to remove the substance added to the dilute draw solution. In one embodiment, the porting system is in fluid communication with the first chamber of the reverse osmosis unit.

In additional embodiments, the system includes means for altering, for example reducing, an osmotic pressure of the dilute draw solution. The means for altering the osmotic pressure of the dilute draw solution can include at least one of chemical addition, chemical subtraction, reduction-oxidation, reactive extraction, filtration, precipitation, or exposure to an energy signal, such as, for example, an electromagnetic signal (photolysis), an electrical signal (electrolysis), or a thermal signal (thermolysis). Further, the system can also include at least one treatment system in fluid communication with at least one of the forward osmosis unit, the reverse osmosis unit, or the separation system to reverse the osmotic pressure alteration of the dilute draw solution. In one or more embodiments, the means for altering the osmotic pressure of the dilute draw solution is in fluid communication with the first chamber of the reverse osmosis unit.

In yet another aspect, the invention relates to additional systems and methods for extracting a solvent from a solution. One example of such a system includes a first forward osmosis unit, a second forward osmosis unit, and a separation system. The first forward osmosis unit includes a first chamber having an inlet fluidly coupled to a source of the first solution, a second chamber having an inlet fluidly coupled to a source of a concentrated first draw solution, and a semi-permeable membrane system separating the first chamber from the second chamber. The semi-permeable membrane is configured for osmotically separating the solvent from the first solution, thereby forming a second solution in the first chamber (or on a first side of the membrane) and a dilute first draw solution in the second chamber (or opposite side of the membrane). The second forward osmosis unit is in fluid communication with the first forward osmosis unit and includes a first chamber having an inlet fluidly coupled to an outlet of the second chamber of the first forward osmosis unit and configured for receiving the dilute first draw solution from the first forward osmosis unit, a second chamber having an inlet fluidly coupled to a source of a concentrated second draw solution, and a semi-permeable membrane system separating the first chamber from the second chamber. The semi-permeable membrane is configured for osmotically separating the solvent from the dilute first draw solution, thereby forming the concentrated first draw solution in the first chamber (or on the first side of the membrane) and a dilute second draw solution in the second chamber (or opposite side of the membrane). The separation system is in fluid communication with the second forward osmosis unit and configured to separate the dilute second draw solution into the concentrated second draw solution and a solvent stream. The separation system includes an inlet fluidly coupled to an outlet of the second chamber of the second forward osmosis unit for receiving the dilute second draw solution therefrom and an outlet fluidly coupled to the second chamber of the forward osmosis unit for introducing the concentrated second draw solution to the second forward osmosis unit.

In various embodiments of the foregoing aspect, the system includes a stripper in fluid communication with the second chamber of the first forward osmosis unit and the first chamber of the second forward osmosis unit. The stripper is configured to further concentrate the first draw solution and/or remove draw solutes from the second draw solution that may have reverse fluxed through the membrane of the second forward osmosis unit. In one or more embodiments, at least one of the first or second forward osmosis units is submerged. Additionally, the system can include a reverse osmosis unit in fluid communication with the second chamber of the first forward osmosis unit and the first chamber of the second forward osmosis unit. The reverse osmosis unit can be configured to remove solvent from the dilute first draw solution. In addition, this system and all systems described herein can include the disclosed means for altering the osmotic pressure of the draw solution to enhance the operation of their respective systems.

In another aspect, the invention relates to still further systems and methods for extracting a solvent from a solution. In one example of such a system, the system includes a reverse osmosis unit, a first forward osmosis unit, a second forward osmosis unit, and a separation system. The reverse osmosis unit includes a first chamber in fluid communication with a source of the first solution, a semi-permeable membrane coupled to the first chamber, and a second chamber coupled to the semi-permeable membrane and configured for receiving a first portion of the solvent fluxed through the membrane, thereby leaving a concentrated first solution in the first chamber of the reverse osmosis unit. The first forward osmosis unit is fluidly coupled to the reverse osmosis unit and includes a first chamber having an inlet in fluid communication with the first chamber of the reverse osmosis unit and configured for receiving the concentrated first solution, a second chamber having an inlet fluidly coupled to a source of a concentrated draw solution, and a semi-permeable membrane system separating the first chamber from the second chamber. The semi-permeable membrane is configured for osmotically separating a second portion of the solvent from the concentrated first solution, thereby forming a further concentrated first solution in the first chamber (or side of the membrane) and a dilute draw solution in the second chamber (or side of the membrane). The second forward osmosis unit is in fluid communication with the first forward osmosis unit and includes a first chamber having an inlet fluidly coupled to an outlet of the first chamber of the first forward osmosis unit and configured for receiving the further concentrated first solution from the first forward osmosis unit, a second chamber having an inlet fluidly connected to a source of a feed solution, and a semi-permeable membrane system separating the first chamber from the second chamber. The semi-permeable membrane is configured for osmotically separating a solvent from the feed solution, thereby diluting the concentrated first solution in the first chamber (or side of the membrane) and concentrating the feed solution in the second chamber (or side of the membrane). In various embodiments, the further concentrated first solution is directed to the second forward osmosis unit under pressure (e.g., via a pump). The separation system is in fluid communication with the first forward osmosis unit and configured to separate the dilute draw solution into the concentrated draw solution and a solvent stream. The separation system includes an inlet fluidly coupled to an outlet of the second chamber of the first forward osmosis unit for receiving the dilute draw solution therefrom and an outlet fluidly coupled to the second chamber of the first forward osmosis unit for introducing the concentrated draw solution to the first forward osmosis unit.

In various embodiments of the foregoing aspect, the second forward osmosis unit is a PRO unit and the system includes a turbine in fluid communication with the first chamber of the second forward osmosis unit and configured for receiving the pressurized, diluted first solution. The system can also include a valve arrangement (e.g., a by-pass system) in fluid communication with the reverse osmosis unit and the second forward osmosis unit and configured to return the diluted first solution from the outlet of the first chamber of the second forward osmosis unit to the inlet of the first chamber of the reverse osmosis unit. In various embodiments, the feed solution comprises a wastewater effluent stream. Additionally, the system can include an energy recovery device in fluid communication with the reverse osmosis unit to recapture energy from the reverse osmosis unit.

In another aspect, the invention relates to additional systems and methods for extracting a solvent from a solution. One such system includes a selective membrane unit, a forward osmosis unit, a separation system, and at least one valve arrangement. The selective membrane unit conditions a first solution and includes a first chamber having an inlet fluidly coupled to a source of the first solution, a second chamber having an inlet fluidly coupled to a source of a second solution, and a selective membrane separating the first chamber from the second chamber. The selective membrane is configured to selectively allow certain ions within at least the first solution to pass from the first solution to the second solution, thereby conditioning the first solution (e.g., softening the solution). The forward osmosis unit is in fluid communication with the selective membrane unit and includes a first chamber having an inlet fluidly coupled to at least one of the source of the first solution or an outlet of the first chamber of the selective membrane unit for receiving the conditioned first solution, a second chamber having an inlet fluidly coupled to a source of a concentrated draw solution, and a semi-permeable membrane system separating the first chamber from the second chamber. The semi-permeable membrane is configured for osmotically separating the solvent from the first solution, thereby forming the source of the second solution in the first chamber and a dilute draw solution in the second chamber. The separation system is in fluid communication with the forward osmosis unit and is configured to separate the dilute draw solution into the concentrated draw solution and a solvent stream. The separation system includes an inlet fluidly coupled to an outlet of the second chamber of the forward osmosis unit for receiving the dilute draw solution therefrom and an outlet fluidly coupled to the second chamber of the forward osmosis unit for introducing the concentrated draw solution to the forward osmosis unit. The valve arrangement is in fluid communication with the first chamber of the forward osmosis unit, the second chamber of the selective membrane unit, and an alternative source of the second solution. The valve arrangement can be configured to direct the second solution from either the first chamber of the forward osmosis unit or the alternative source to the second chamber of the selective membrane unit.

In various embodiments of the foregoing aspect, the system includes a second valve arrangement in fluid communication with the source of the first solution, the selective membrane unit, and the forward osmosis unit. The second valve arrangement is configured for directing the first solution to either the selective membrane unit or the forward osmosis unit or directing the conditioned first solution to the forward osmosis unit. In one or more embodiments, the various valve arrangements can include the ports (e.g., inlets) and necessary valves for introducing a solution to the selective membrane unit and/or the forward osmosis unit to, for example, prime either or both units. Additionally or alternatively, the ports can be outlets for removing a solution from either unit. In one or more embodiments, the system includes at least one treatment system in fluid communication with at least one of the selective membrane unit, the forward osmosis unit, or the separation system. The selective membrane can be a cation selective membrane or any other type of membrane to suit a particular application.

In various embodiments of the foregoing aspects, the concentrated draw solution includes ammonia and carbon dioxide in a desired molar ratio of at least one to one. However, other draw solutions are contemplated and considered within the scope of the invention, including, for example, NaCl or any of the various alternative draw solutions disclosed in PCT Patent Application No. PCT/US13/69895 (the '895 application), filed Nov. 13, 2013, the disclosure of which is hereby incorporated by reference herein in its entirety. In addition, other systems and methods for separating and recovering draw solutes and the solvent, such as those disclosed in the '895 application, are contemplated and considered within the scope of the invention. Furthermore, various pretreatment and post-treatment systems can be incorporated in the forgoing aspects of the invention. The pretreatment systems can include at least one of a heat source for preheating the first solution, means for adjusting the pH of the first solution, means for disinfection (e.g., chemical or UV), separation and clarification, a filter or other means for filtering the first solution (e.g., carbon or sand filtration or reverse osmosis), means for polymer addition, ion exchange, or means for softening (e.g., lime softening) the first solution. The post-treatment systems can include at least one of a reverse osmosis system, an ion exchange system, a second forward osmosis system, a distillation system, a pervaporator, a mechanical vapor recompression system, a heat exchange system, or a filtration system. In additional embodiments, the system can also include a recycling system including an absorber configured to facilitate reintroduction of the draw solutes to the second chamber to maintain the desired molar ratio of the draw solution.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which:

FIG. 7 is a schematic representation of an alternative osmotic system including an osmotic back-flushing system in accordance with one or more embodiments of the invention;

DETAILED DESCRIPTION

Figure 1:
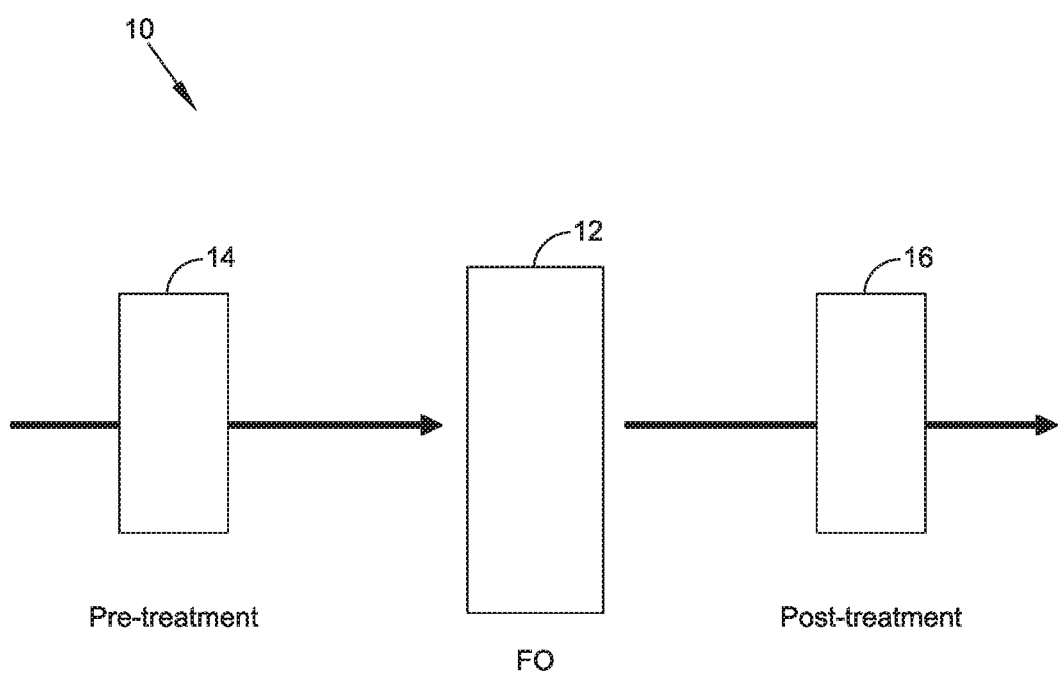
FIG. 1 is a schematic representation of a system for osmotic extraction of a solvent in accordance with one or more embodiments of the invention.

In accordance with one or more embodiments, an osmotic method for extracting water from an aqueous solution may generally involve exposing the aqueous solution to a first surface of a forward osmosis membrane. A second solution, or draw solution, with an increased concentration relative to that of the aqueous solution may be exposed to a second opposed surface of the forward osmosis membrane. Water may then be drawn from the aqueous solution through the forward osmosis membrane and into the second solution generating a water-enriched solution via forward osmosis, which utilizes fluid transfer properties involving movement from a less concentrated solution to a more concentrated solution. The water-enriched solution, also referred to as a dilute draw solution, may be collected at a first outlet and undergo a further separation process to produce purified water. A second product stream, i.e., a depleted or concentrated aqueous process solution, may be collected at a second outlet for discharge or further treatment. Alternatively, the various systems and methods described herein can be carried out with non-aqueous solutions.

In accordance with one or more embodiments, a forward osmosis membrane module may include one or more forward osmosis membranes. The forward osmosis membranes may generally be semi-permeable, for example, allowing the passage of water, but excluding dissolved solutes therein, such as sodium chloride, ammonium carbonate, ammonium bicarbonate, and ammonium carbamate. Many types of semi-permeable membranes are suitable for this purpose provided that they are capable of allowing the passage of water (i.e., the solvent) while blocking the passage of the solutes and not reacting with the solutes in the solution.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated.

In accordance with one or more embodiments, a forward osmosis membrane module may generally be constructed and arranged so as to bring a first solution and a second solution into contact with first and second sides of a semi-permeable membrane, respectively. Although the first and second solutions can remain stagnant, it is preferred that both the first and second solutions are introduced by cross flow, i.e., flows parallel to the surface of the semi-permeable membrane. This may generally increase membrane surface area contact along one or more fluid flow paths, thereby increasing the efficiency of the forward osmosis processes. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

In accordance with one or more embodiments, draw solutes may be recovered for reuse. A separation system may strip solutes from dilute draw solution to produce product water substantially free of the solutes. In some embodiments, the separation system may include a distillation column or other thermal or mechanical recovery mechanism. Draw solutes may then be returned, such as by a recycle system, back to the concentrated draw solution. Gaseous solutes may be condensed or absorbed to form a concentrated draw solution. An absorber may use dilute draw solution as an absorbent. In other embodiments, product water may be used as an absorbent for all or a portion of the absorption of the gas streams from a solute recycling system.

FIG. 1 presents a schematic of a system 10 for osmotic extraction of a solvent using a forward osmosis system/process 12 including one or more pretreatment and/or post-treatment unit operations 14, 16. Various forward osmosis systems and processes can be used, such as those described herein and further described in U.S. Pat. Nos. 6,391,205 and 8,002,989; and U.S. Patent Publication Nos. 2011/0203994, 2012/0273417, 2012/0267306, and 2012/0267307; the disclosures of which are hereby incorporated by reference herein in their entireties.

In accordance with one or more embodiments, the system 10 may include one or more pretreatment operations 14 to enhance the forward osmosis process 12. The pretreatment operation can include at least one of a heat source for preheating the first solution, means for adjusting the pH of the first solution, means for disinfection (e.g., chemical or UV), separation and clarification, a filter or other means for filtering the first solution (e.g., carbon or sand filtration, nanofiltration, or reverse osmosis), heat exchange, means for polymer addition, use of an anti-scalant, ion exchange, or means for softening (e.g., lime softening) the first solution.

In accordance with one or more embodiments, the system 10 may include one or more post-treatment operations 16. The post-treatment systems/operations can include at least one of a reverse osmosis system, an ion exchange system, additional forward osmosis processes, a distillation system, a pervaporator, a mechanical vapor recompression system, a heat exchange system, or a filtration system. Post-treatment may reduce product water salinity below that produced by a single pass forward osmosis system. In other embodiments, post-treatment may alternatively or additionally be used to remove draw solutes that would otherwise be present in a product stream. In some specific non-limiting embodiments, forward osmosis brine discharge may be post-treated using ion exchange, distillation, pervaporation, membrane distillation, aeration, biological treatment or other process to remove draw solutes that reverse diffuse into brine. Additional post-treatment operations can include zero liquid discharge (ZLD) treatment using, for example, crystallization and evaporation. In one embodiment, the ZLD treatment uses a forward osmosis system, for example, in place of an evaporation system. In additional embodiments, the system can also include a recycling system including an absorber configured to facilitate reintroduction of the draw solutes to the second chamber to maintain the desired molar ratio of the draw solution.

Figure 2:
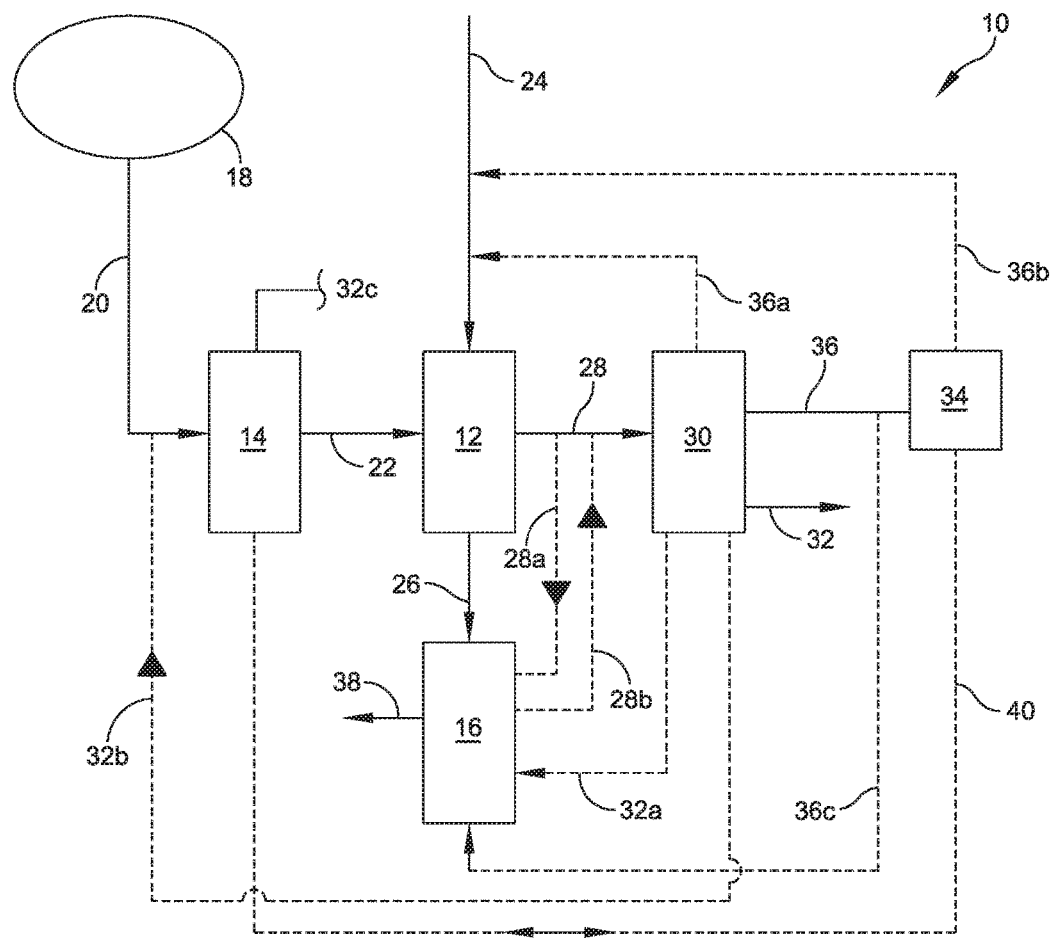
FIG. 2 is schematic representation of one application of the system of FIG. 1 in accordance with one or more embodiments of the invention.

FIG. 2 represents one possible application of the system 10 for osmotic extraction of a solvent in accordance with one or more embodiments of the invention. As discussed with respect to FIG. 1, the system 10 includes the forward osmosis system 12 and one or more pre- and post-treatment units 14, 16. The system 10 can include any combination of pre- and/or post-treatment units 14, 16 in conjunction with one or more forward osmosis systems 12, including only pretreatment or only post-treatment. The various systems/units described herein may be interconnected via conventional plumbing techniques and can include any number and combination of components, such as pumps, valves, sensors, gauges, etc., to monitor and control the operation of the various systems and processes described herein. The various components can be used in conjunction with a controller as described hereinbelow.

In the application shown in FIG. 2, the system 10 is used to treat brackish water from an inland source 18; however, other feed sources are contemplated and considered within the scope of the invention. As shown, a feed stream 20 is directed to the pretreatment unit 14, where the feed stream is, for example, heated. Once the feed stream has been pretreated, the treated stream 22 is then directed to the forward osmosis system 12, where it provides the first solution as discussed above. Optionally, the treated stream 22 could be directed to additional pretreatment units for further processing (e.g., pH adjustment) before entering the forward osmosis system 12. In some embodiments, the pretreatment unit 14 can include a reverse osmosis module to concentrate the feed 20 prior to introducing it to the FO module. This arrangement can be particularly useful where the initial feed has a low salinity, as discussed below. A draw solution is provided to the forward osmosis system 12 via stream 24 to provide the osmotic pressure gradient necessary to promote transport of the solvent across the membrane, as discussed herein.

At least two streams exit the forward osmosis system 12: a concentrated feed or treated stream 26, from which solvent has been extracted; and a dilute draw stream 28, to which solvent has been added. The concentrated stream 26 can then be directed to a post-treatment unit 16 for further processing, such as a second forward osmosis system to recover additional solvent. Additional post-treatment processes may be utilized, for example, crystallization and evaporation, to further provide for zero liquid discharge. The fully processed or concentrated feed can be disposed of, recycled, or otherwise reclaimed depending on the nature of the concentrate (arrow 38).

The dilute draw stream 28 can be directed to a separation system 30, where the solvent and/or draw solutes can be recovered. Optionally, the dilute draw stream 28 can also be directed to a post-treatment unit as desired for additional processing (stream 28a), for example, the dilute draw solution can be preheated before being directed to the separation system 30 (stream 28b). In one or more embodiments, the separation system 30 separates the draw solutes from the dilute draw stream 28 to produce a substantially purified solvent stream 32, for example, potable water, and a draw solute stream 36. In one or more embodiments, the solvent stream 32 can also be directed to a post-treatment unit for further processing (stream 32a) depending on the end use of the solvent. For example, the solvent can be further treated via distillation to remove additional draw solutes that may still be present in the solvent. In one or more embodiments, the draw solute stream 36 can be returned directly to the draw stream 24 (stream 36a), directed to a recycling system 34 for reintegration into the draw stream 24 (stream 36b), or directed to a post-treatment unit (stream 36c) for further processing depending on the intended use of the recovered draw solutes. In one or more embodiments, the recycling system 34 can be used in conjunction with the pretreatment unit 14 to, for example, provide heat exchange with the feed stream 20 (stream 40).

In another possible application, where the system 10 is used to treat a low-salinity feed 20, the pretreatment system 14 can be a reverse osmosis unit that concentrates the feed 20 before directing it to the forward osmosis system 12. In this embodiment, the pretreatment unit 14 provides a solvent/permeate stream 32c and a concentrated feed stream 22 for treatment by the FO module 12. Additionally, this pretreatment/RO unit 14 can be used in conjunction with or in place of a post-treatment unit 16 that treats the product solvent 32 from the separation system 30 (stream 32a). Specifically, a product solvent stream 32b is directed from the separation system 30 to the feed stream 20, where it can be combined therewith and introduced into the pretreatment/RO unit 14. Alternatively or additionally, the product stream 32b can be fed directly into the unit 14. Generally, the various streams can be directed between the various treatment units 14, 16, modules 12, and subsystems as necessary to optimize the operation of the process.

Figure 3:
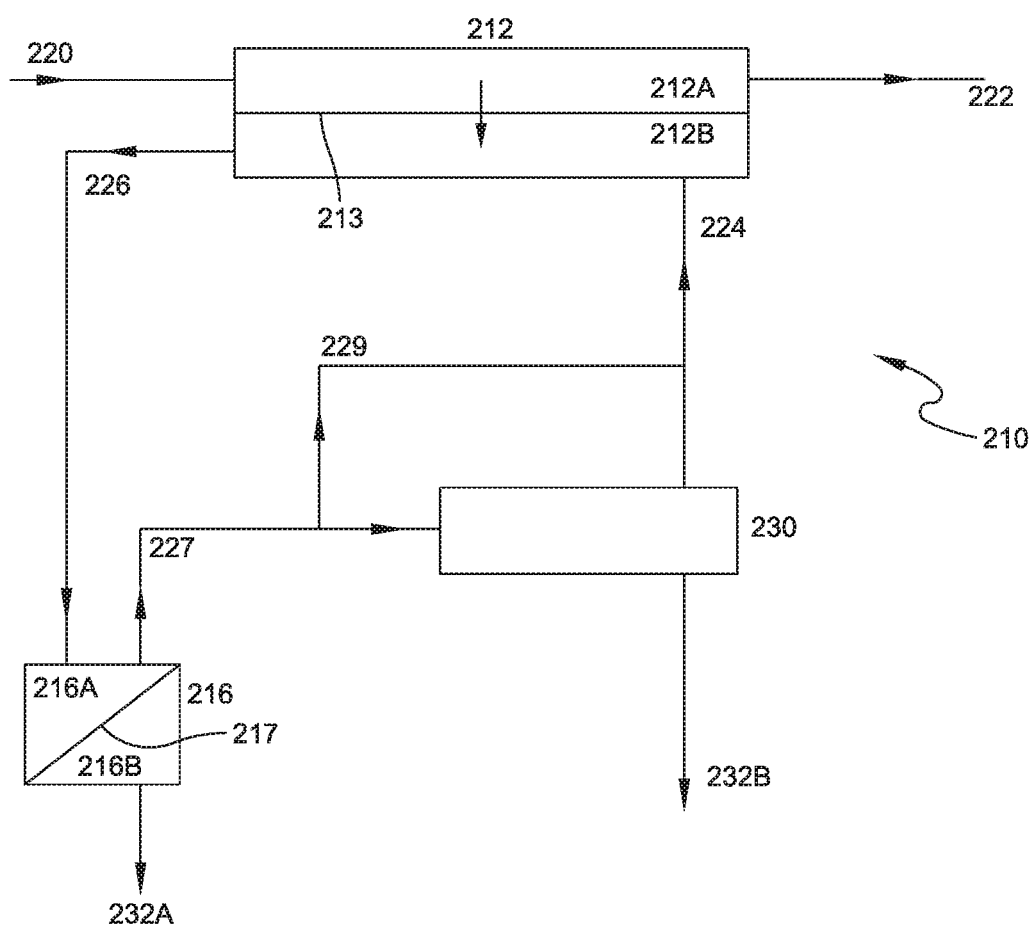
FIG. 3 is a schematic representation of an alternative osmotic system including a forward osmosis unit and a reverse osmosis unit in accordance with one or more embodiments of the invention.

FIG. 3 is a simplified schematic representation of an alternative system 210 for the extraction of a solvent that also uses a forward osmosis unit 212, a reverse osmosis unit 216, and a separation/recycling system 230, all in fluid communication. The system 210 is similar to those previously disclosed, for example, the forward osmosis unit 212 includes a forward osmosis membrane 213, the reverse osmosis unit includes a reverse osmosis membrane 217, etc. The system 210 also includes all of the necessary valves, pumps, piping, etc. to suit a particular application. In one embodiment, the system 210 is configured for use with a low salinity feed, which can result in a highly diluted draw solution.

Specifically, and as shown in FIG. 3, a feed solution 220 is directed to one side of the membrane 213 of the forward osmosis unit 212, while a concentrated draw solution 224 is directed to the other side of the membrane 213. In the case where the feed solution 220 is a low salinity feed, the draw solution becomes highly diluted. The highly diluted draw solution 226 exits the forward osmosis unit 212 and is directed to the reverse osmosis unit 216, while the concentrated feed solution 222 exits the forward osmosis unit 212, where it can be sent for further processing or otherwise discarded. In some cases, the concentrated feed solution 222 contains one or more desirable constituents, such as a food or pharmaceutical product.

The highly diluted draw solution 226 is pressurized in the reverse osmosis unit 216 forcing solvent through the membrane 217. This product solvent 232A can be removed from the reverse osmosis unit 216 as, for example, product water that can be used as is, be disposed of, sent for further processing, or employed as a heat transfer fluid within an integrated system. The draw solution that remains on the first side 216A of the reverse osmosis unit 216 is now less diluted and can be sent for further processing to further concentrate the draw solution and/or recycled back to the forward osmosis unit 212 as is, as necessary to suit a particular application. As shown in FIG. 3, the less dilute draw solution 227 is directed to the separation/recycling unit 230 for further concentration. However, the system 210 also includes an optional by-pass line 229 (and any necessary valving) for directing at least a portion of the less dilute draw solution back to the forward osmosis unit 212, either directly or in combination with the concentrated draw solution stream 224 exiting the separation/recycling unit 230.

Generally, the separation/recycling unit can be of any of the types disclosed in, for example, U.S. Patent Publication No. 2012/0067819 (the '819 publication), the disclosure of which is hereby incorporated by reference herein in its entirety, or the '895 application. In one embodiment, the unit 230 includes a thermal recovery process to separate the draw solutes from the solvent. In an alternative embodiment, the unit 230 includes a reverse osmosis module. The recovered draw solutes exit the unit 230 (in one embodiment being mixed with the by-passed dilute draw solution stream 229) and are directed to the forward osmosis unit 212 as the concentrated draw solution 224, while the remaining solvent 232B exits the unit 230 as, for example, product water that can be used as is, be disposed of, or sent for further processing.

Figure 3A:
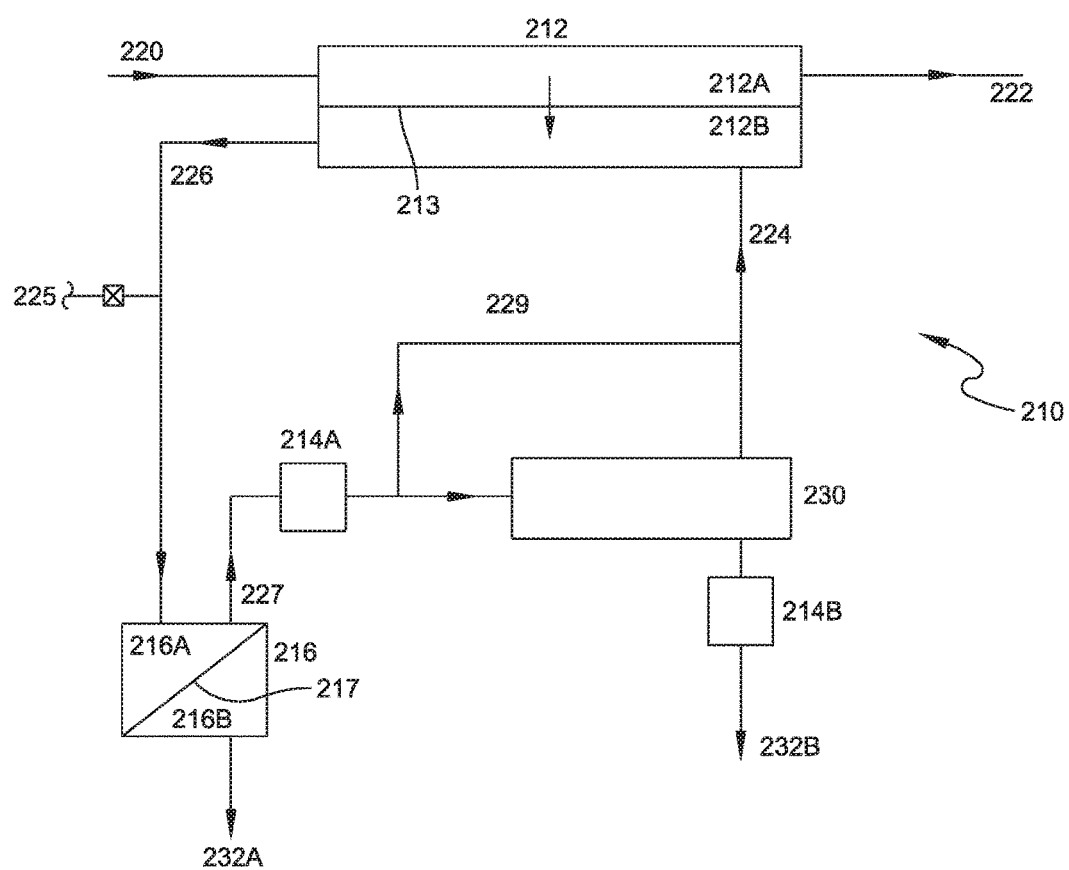
FIG. 3A is a schematic representation of an alternative embodiment of the system of FIG. 3.

FIG. 3A depicts an alternative to the system 210 of FIG. 3, where the system 210 includes means for altering (e.g., reducing) the osmotic pressure of the dilute draw solution that is directed to the reverse osmosis unit 216. Reducing the osmotic pressure of the dilute draw solution makes the reverse osmosis process more efficient, as less energy is required to overcome the osmotic pressure of the dilute draw solution, thereby resulting in greater solvent extraction from the reverse osmosis unit 216. Generally, the means for reducing the osmotic pressure can include a variety of mechanisms and/or processes, such as a catalyzed phase change, heating, cooling, addition of a reactant, or introduction of an electrical or magnetic field. In some embodiments, a physical or chemical agent may be introduced to the dilute draw solution 226 to react with a draw solute therein reversibly or irreversibly to reduce its concentration or change its rejection characteristics by the membrane. In at least one embodiment, introduction of an electrical or electromagnetic (e.g., UV light) signal may cause a change in the draw solute, such as a phase change, change in degree of ionization, or other induced changes that reduces the osmotic pressure of the solution 226. In some embodiments, the osmotic pressure of the dilute draw solution 226 may be reduced by adjusting a pH level, adjusting the ionic nature of a solute, or modifying the physical size of a solute. For example, an ionic species may be rendered nonionic, or a large species may be made relatively smaller. In some embodiments, techniques not using heating, such as electrodialysis (ED), cooling, vacuum or pressurization may be implemented. In at least one embodiment, the solubility of an organic species of solute may be manipulated, such as by changing temperature, pressure, pH or other characteristic of the dilute draw solution 226. In at least some embodiments, ion exchange may be implemented, such as sodium recharge ion exchange techniques, or acid and base recharged ion exchange. Other means for reducing the osmotic pressure are contemplated and considered within the scope of the invention.

In various embodiment, the system 210 includes an inlet 225 or other point of introduction, including any necessary valving, (i.e., a porting system) for adding a substance to the dilute draw solution 226. In one embodiment, the substance is copper hydroxide [$Cu(OH)_2$]; however, other metals/substances are contemplated and considered within the scope of the invention. The additional substance can be used to scavenge or otherwise bind to certain draw solutes within the dilute draw solution 226. In a particular embodiment where the draw solution is ammonia based, the copper hydroxide will bind with the ammonia to create a larger molecule that is more easily rejected by the membrane 217 of the reverse osmosis unit 216, thereby altering the osmotic pressure of the dilute draw solution.

In order to more fully recover the draw solutes for reuse and to recover the added substance (or otherwise reverse the results of having altered the osmotic pressure of the dilute draw solution), the system 210 will also include one or more treatment units 214A, 214B that can be disposed, for example, on the inlet to the separation/recycling unit 230 and/or on the product solvent outlet. The treatment unit(s) 214 can be of any of the types previously described with respect to the pre- and post-treatment units 14, 16. For example, the first treatment unit 214A can include a phase change mechanism to separate the copper hydroxide and ammonia, while the second treatment unit 214B can include nanofiltration to remove the copper hydroxide from the product solvent 232B. Additionally or alternatively, the pretreatment units 214 can be or include a heat source (e.g., heat exchanger). For example, in one embodiment, the dilute draw solution can be preheated before going to the separation/recycling system 230. The various treatment units 214 can also incorporate any of the mechanisms and/or processes described above for altering the osmotic pressure of the dilute draw solution. In one or more embodiments, the process can include exposing the less dilute draw solution 227 to a thermal, electro-magnetic, or electrical signal (e.g., an electrolytic cell). In a particular embodiment, the dilute draw solution 226 is exposed to an ultraviolet or other energy emission source to reduce its osmotic pressure by, for example, overcoming the activation energy to convert ionic species to a single neutral compound with a higher molecular weight. Changing the chemistry of the dilute draw solution allows the reverse osmosis process to get a higher solvent recovery with the same pumping pressure.

Figure 4:
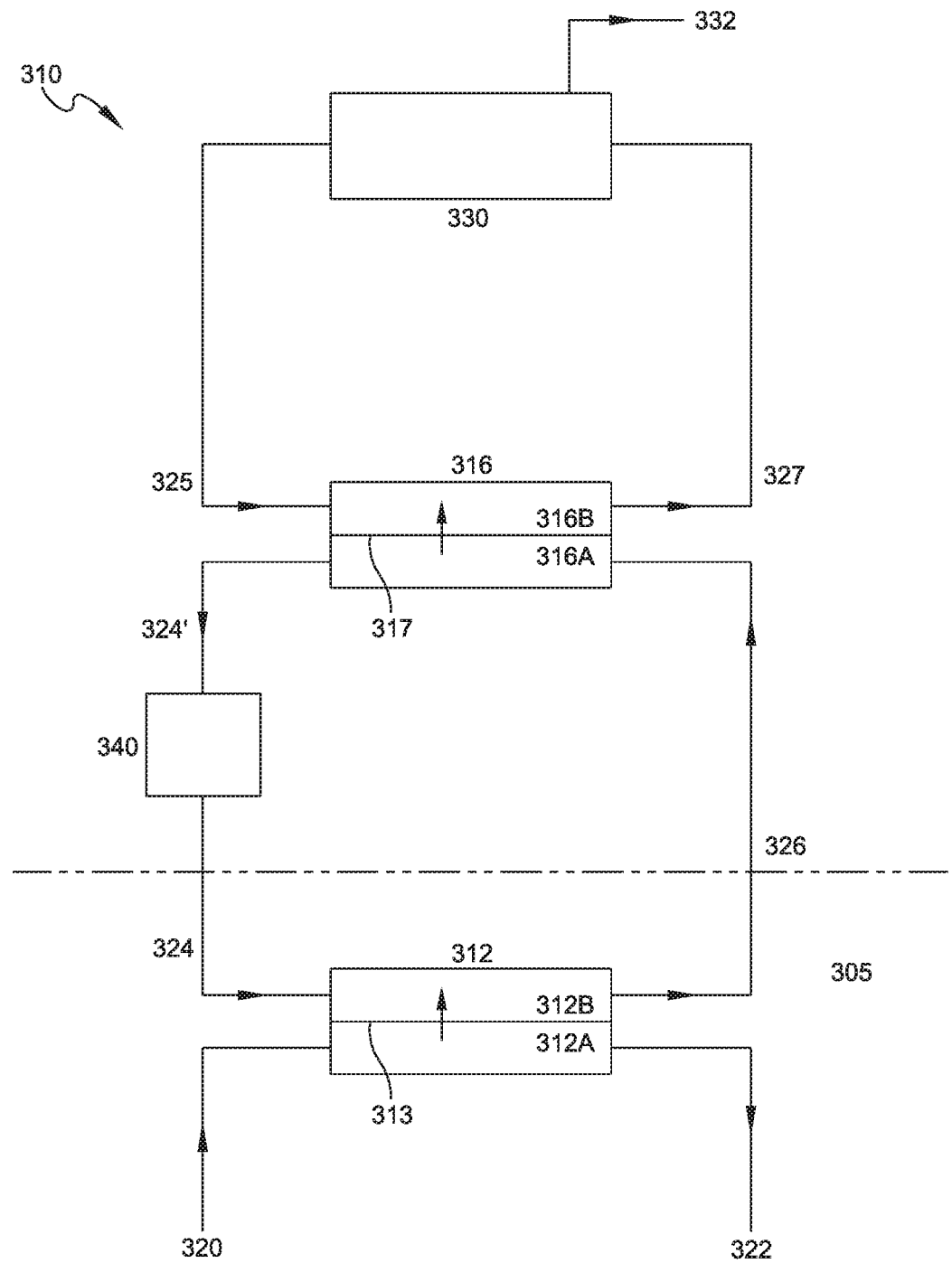
FIG. 4 is a schematic representation of an alternative osmotic system including two forward osmosis units in accordance with one or more embodiments of the invention.

FIG. 4 is a simplified schematic representation of another alternative system 310 for the extraction of a solvent. This system 310, however, uses two forward osmosis units 312, 316 and a separation/recycling system 330, all in fluid communication. The system 310 is similar to those previously disclosed, for example, the forward osmosis units 312, 316 include forward osmosis membranes 313, 317 and the system 310 also includes all of the necessary valves, pumps, piping, etc. to suit a particular application. In one embodiment, the system 310 is configured for use where the first forward osmosis unit 312 is submerged, for example in a tank 305, and uses a different draw solution than the second forward osmosis unit 316.

As shown in FIG. 4, a feed solution 320 is directed to one side of the membrane 313 of the first forward osmosis unit 312, while a concentrated first draw solution 324 is directed to the other side of the membrane 313. In one embodiment, the first draw solution is selected from the group consisting of $MgCl_2$, $CaCl_2$, $Ca(NO_3)_2$, NaCl, KCl, or similar. In one or more embodiments, the first draw solution is selected to suit a submerged system. The diluted first draw solution 326 exits the forward osmosis unit 312, while the concentrated feed 322 exits the forward osmosis unit 312. In one or more embodiments, the concentrated feed 322 can be discharged into the tank 305 or can be disposed of or sent for further processing. In some embodiments, the draw solution comprises a photolytic draw solute, in which case the diluted first draw solution 326 can be exposed to UV light or other excitation source to lower its osmotic pressure before it is sent to the second forward osmosis unit 316. Other means for reducing the osmotic pressure (e.g., chemical addition) may be incorporated as discussed hereinabove.

The dilute first draw solution 326 is directed to one side of the membrane 317 of the second forward osmosis unit 316, while a concentrated second draw solution 325 is directed to the other side of the membrane 317 so as to extract solvent from the dilute first draw solution 326, thereby reconcentrating the first draw solution (discharge 324'). The reconcentrated first draw solution 324' is directed to, for example, a stripper 340 or other treatment process for further conditioning/concentrating of the first draw solution (discharge 324) so that it may again be directed to the first forward osmosis unit 312.

The diluted second draw solution 327 is discharged from the second forward osmosis unit 316 and directed to the separation/recycling system 330 for reconcentration of the second draw solution and the recovery a product solvent 332. Generally, the separation/recycling unit 330 can be of any of the types disclosed herein, including in the '819 publication or '895 application and separates the draw solutes from the solvent. The recovered draw solutes/reconcentrated draw solution 325 exit the unit 330 and are directed back to the second forward osmosis unit 316. The remaining solvent 332 exits the unit 330 as, for example, product water that can be used as is, sent for further processing, or otherwise discarded.

Figure 4A:
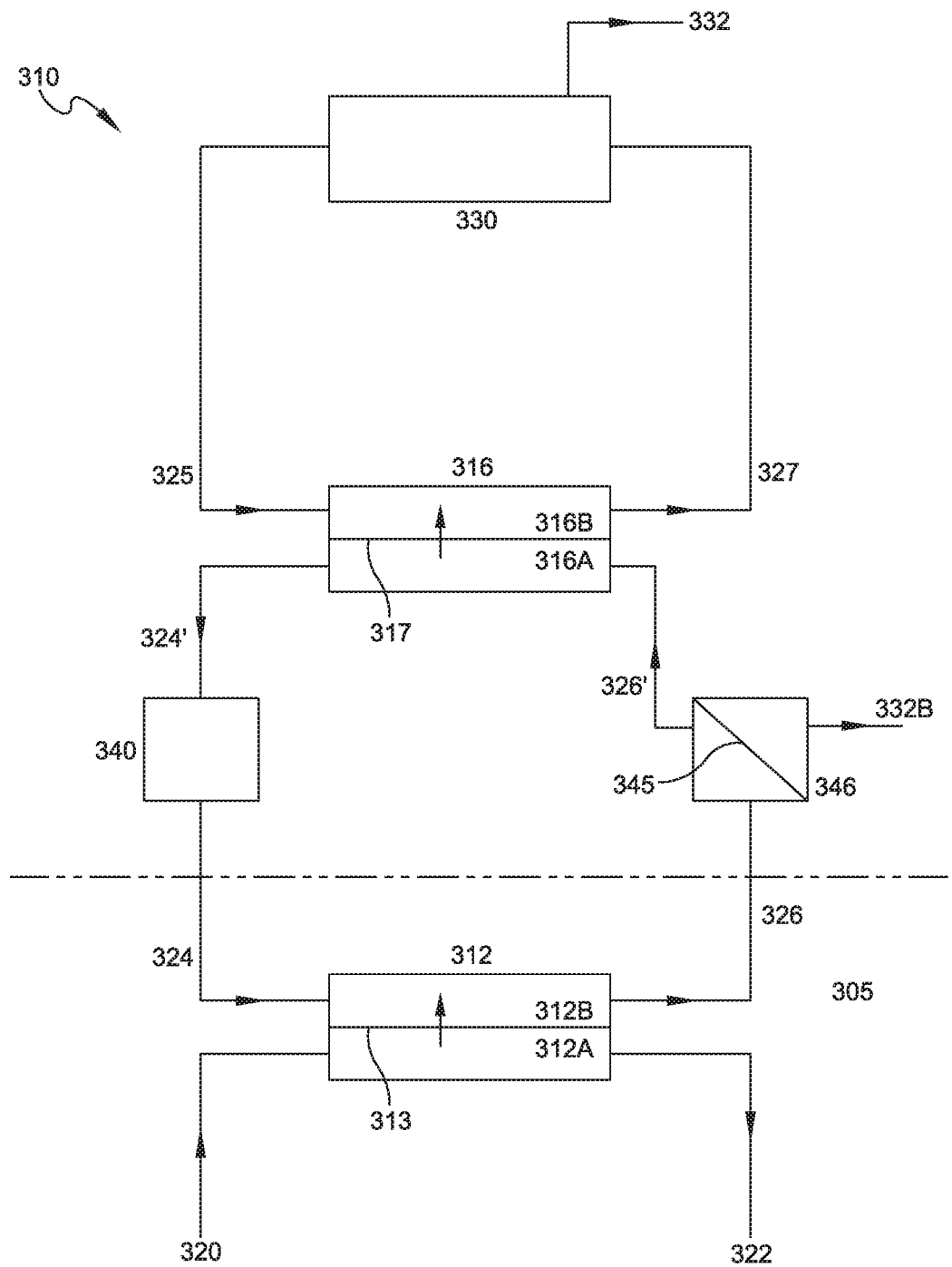
FIG. 4A is a schematic representation of an alternative embodiment of the system of FIG. 4.

FIG. 4A depicts an alternative to the system 310 of FIG. 4, where the system 310 includes an additional reverse osmosis unit 346 in fluid communication with the dilute first draw solution 326 outlet of the first forward osmosis unit 312 and the feed side of the second forward osmosis unit 316. One particular application for this alternative system is where the first feed 320 is a low salinity feed and the first dilute draw solution 326 may become highly diluted. The reverse osmosis unit 346 can at least partially concentrate the highly diluted draw solution 326 before it is fed to the second forward osmosis unit 316. As shown in FIG. 4A, the dilute draw solution 326 is introduced under pressure to one side of the membrane 345 of the reverse osmosis unit 346. The pressurization of the dilute draw solution 326 may be by virtue of the increased volume of the solution exiting the first forward osmosis unit 312 or with the assist of a pressure exchange device (e.g., a pump). Product solvent 232B (e.g., potable water) is recovered from the other side of the membrane 345 and can be used as is, disposed of, or sent for further processing. In one or more embodiments, the product solvent can be used as drinking water. The less dilute first draw solution 326' exits the reverse osmosis unit 346 and is directed to the second forward osmosis unit 316 for processing as previously described. In addition, the various means for altering the osmotic pressure of the draw solution discussed above may be incorporated into the system 310.

Figure 5:
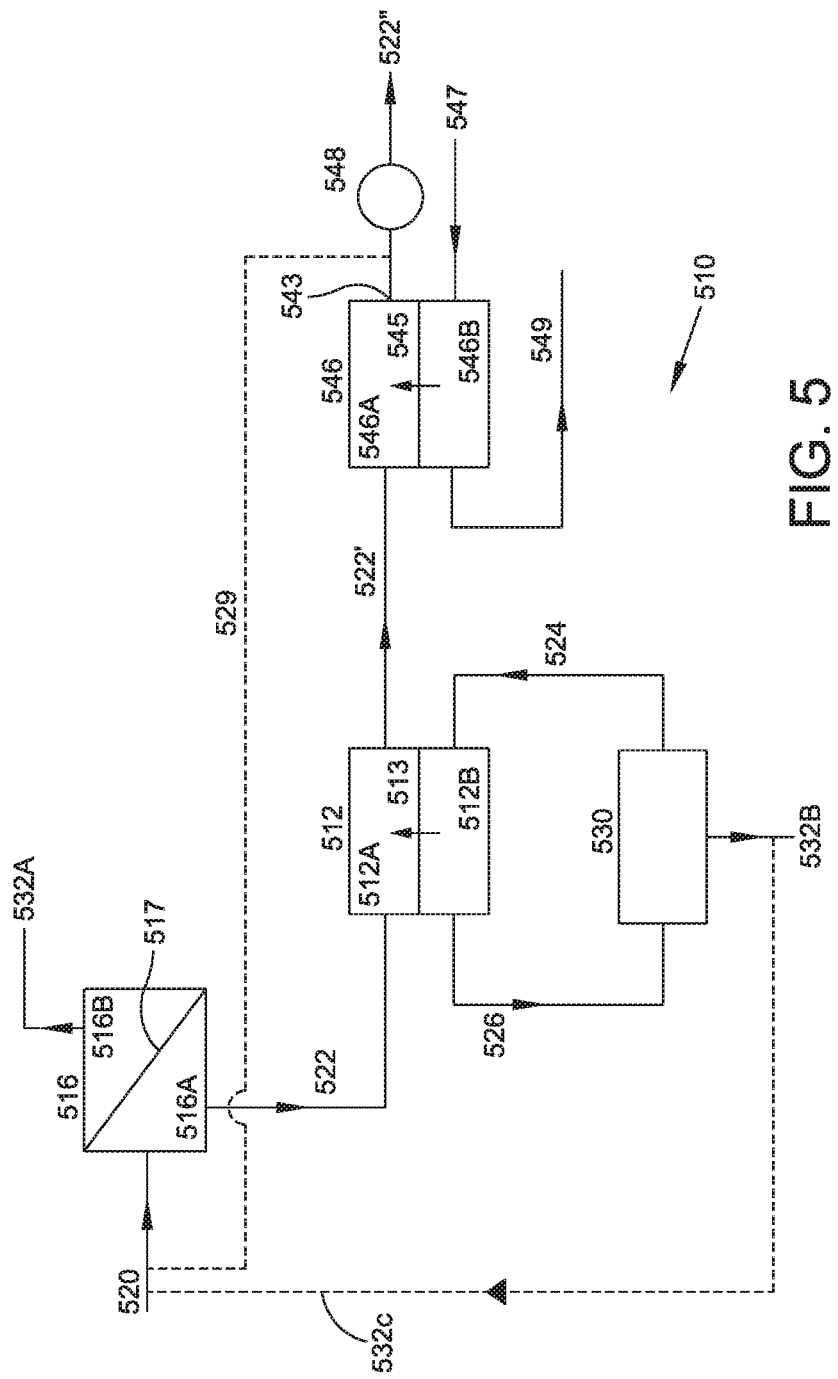
FIG. 5 is a schematic representation of an alternative osmotic system including a reverse osmosis unit, a forward osmosis unit, and a pressure retarded osmosis unit in accordance with one or more embodiments of the invention.

FIG. 5 is a simplified schematic representation of another alternative system 510 for the extraction of a solvent. This system 510 uses a reverse osmosis unit 516, two forward osmosis units 512, 546, and a separation/recycling system 530, all in various states of fluid communication. The system 510 is similar to those previously disclosed, for example, the various osmotic units 512, 516, 546 include membranes 513, 517, 545 as previously described, and the system 510 also includes all of the necessary valves, pumps, piping, etc. to suit a particular application. In one embodiment, the system 510 is configured for an application where wastewater effluent is used to dilute the concentrated feed (e.g., highly concentrated brine) to make it more easily disposable.

As shown in FIG. 5, a feed stream 520 (e.g., seawater) is introduced under pressure to one side of the membrane 517 of the reverse osmosis unit 516. A product solvent 532A (e.g., potable water) is recovered from the other side of the membrane 517 and can be sent for further processing or otherwise discarded. The concentrated feed 522 (e.g., brine) is then directed to one side of the membrane 513 of the first forward osmosis unit 512. In one embodiment, the reverse osmosis unit 516 can be used to concentrate a low salinity feed before directing it to the forward osmosis unit 512. Alternatively, the reverse osmosis unit 516 can be omitted and the feed 520 sent directly to the first forward osmosis unit 512.

A concentrated draw solution 524 is directed to the opposite side of the membrane 513 of the first forward osmosis unit 512 to draw solvent from the feed stream 522 (or 520 in certain embodiments). In one embodiment, the concentrated feed stream 522' is directed to the second forward osmosis unit 546, as described below. The now diluted draw solution 526 exits the first forward osmosis unit 512 and is directed to the separation/recycling system 530 for reconcentration and the recovery of product solvent 532B. Generally, the separation/recycling unit 530 can be of any of the types previously described. The recovered draw solutes/reconcentrated draw solution 524 exit the unit 530 and are directed back to the first forward osmosis unit 512. The remaining solvent 532B exits the unit 530 as, for example, product water that can be used as is, sent for further processing, or otherwise discarded. Alternatively or additionally, the solvent can be directed to the original feed 520 via solvent line 532c and combined with the feed 520 for introduction to the RO module 516 or fed directly to the RO module 516.

The further concentrated feed solution 522' (e.g., concentrated brine) is introduced to one side of the membrane 545 of the second forward osmosis unit 546. In various embodiments, the concentrated feed solution 522' is introduced under pressure and the second forward osmosis unit is operated as a PRO unit. Generally, the concentrated feed 522', especially in the case of concentrated brine, can have a negative impact on the environment if it is discharged as is. For example, the discharge of hyper-saline solutions into natural water sources can disrupt their local ecosystems. The use of the second forward osmosis unit 546 to dilute the concentrated feed 522' can make this diluted feed 522'' overall easier to dispose of and generally more acceptable to discharge. In the present application, the concentrated feed 522' is being used as the source of draw solution. The secondary feed solution from which the concentrated feed 522' draws solvent (e.g., water) is typically a source that has limited application and/or is generally undesirable for human use. In one embodiment, the secondary feed 547 is wastewater effluent, which, while processed and safe to use for many applications, is typically not desirable for human use. Alternatively or additionally, the secondary feed 547 can be from the original feed 520, for example, a split stream with a portion of the feed 520 replacing or supplementing the secondary feed 547.

As shown in FIG. 5, the secondary feed 547 is directed to the opposite side of the membrane 545 of the second forward osmosis unit 546. The concentrated feed 522' draws solvent across the membrane 545 creating a diluted feed 522'' that exits the forward osmosis unit 546 and can be disposed of or sent for further processing. In embodiments where the second forward osmosis unit 546 is a PRO unit, the system 510 can include a turbine 548 in fluid communication with the feed/draw solution outlet 543. Examples of PRO units are disclosed in U.S. Patent Publication Nos. 2010/0024423 and 2010/0183903, the disclosures of which are hereby incorporated herein by reference in their entireties. Alternatively or additionally, the system 510 can include a by-pass line 529 (and any necessary valves) for directing at least a portion of the diluted feed 522'' back to the feed 520 to the reverse osmosis unit 516 and/or the first forward osmosis unit 512.

The concentrated secondary feed 549 exits the second forward osmosis unit 546 and can be disposed of or sent for further processing. In the case of a wastewater effluent feed 547, the concentrated effluent 549, which now has a smaller volume due to the removal of solvent, can be directed to an incinerator or be directed back to the wastewater processing facility for further concentration/treatment. Additionally, the second forward osmosis unit 546 can be submerged in one or more embodiments.

Figure 6:
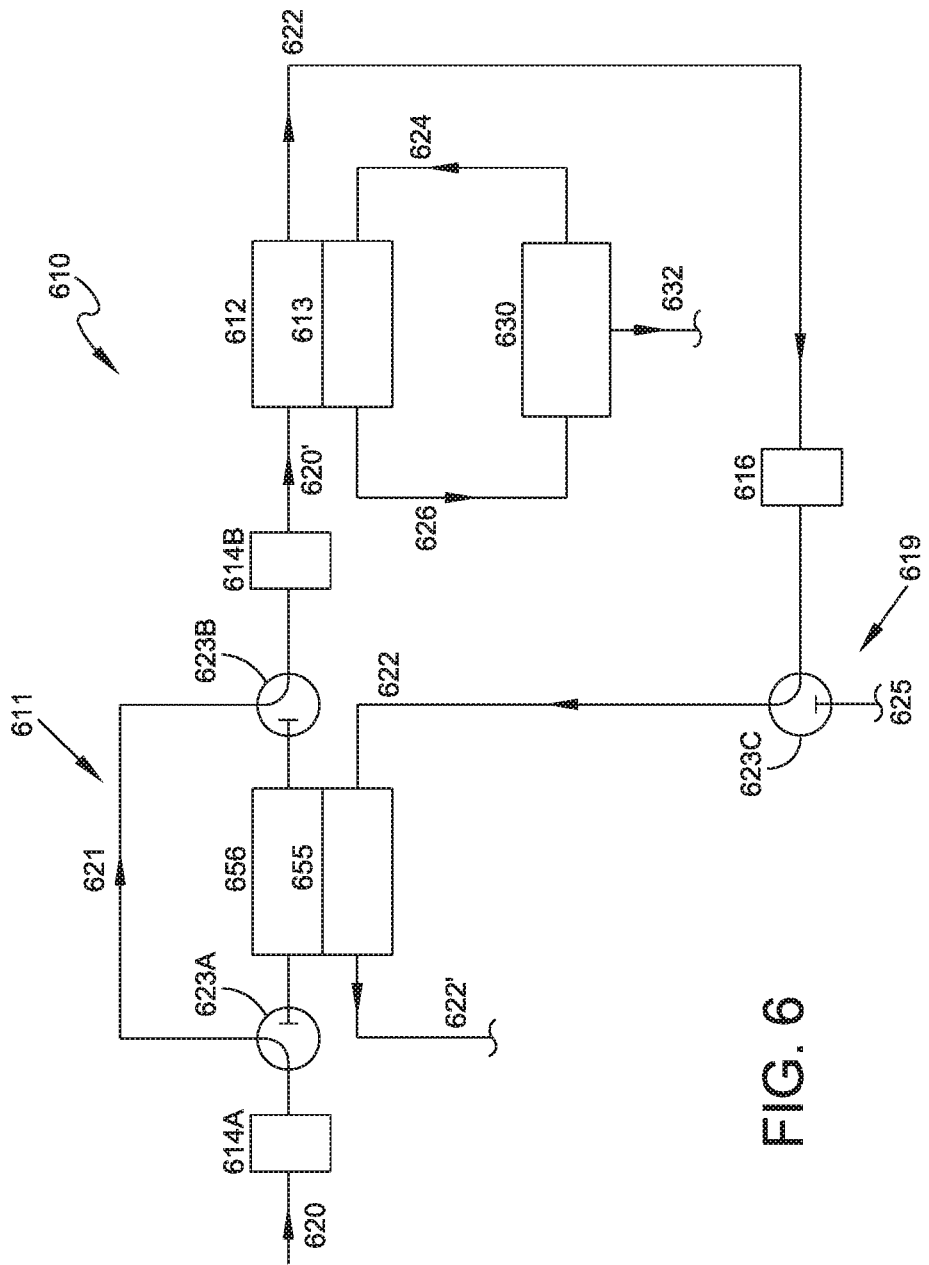
FIG. 6 is a schematic representation of an alternative osmotic system including a forward osmosis unit and a selective membrane unit in accordance with one or more embodiments of the invention.

FIG. 6 is a simplified schematic representation of another alternative system 610 for the extraction of a solvent. This system 610, however, uses one or more forward osmosis unit(s) 612 in fluid communication with a selective membrane unit 656 and a separation/recycling system 630. In various embodiments, the selective membrane is a cation selective membrane 655 and the selective membrane unit 656 is a water softening module. The system 610 is similar to those previously disclosed and can include one or more pre- and/or post-treatment units 614, 616 as described below. The pre- and post-treatment units 614, 616 can be of any of the types previously described. Additionally, the system 610 also includes all of the necessary valves, pumps, piping, etc. to suit a particular application.

As shown in FIG. 6, the system 610 includes the selective membrane unit 656, a by-pass circuit or valve arrangement 611 (valves 623A, 623B and line 621), the forward osmosis unit 612, the separation/recycling system 630, a priming system or second valve arrangement 619 (valve 623C and inlet 625), and the various pre- and post-treatment units 614, 616. The forward osmosis unit 612 and separation/recycling unit 630 generally operate as previously described with respect to the other systems 10, 210, 310, 510. Generally, the first valve arrangement 611 is configured for either directing a feed solution stream 620 to the selective membrane unit 656 or by-passing the selective membrane unit 656 and fluidly connecting the feed stream 620 directly to one side of the forward osmosis membrane 613. The separation/recycling system 630 is fluidly connected to the other side of the forward osmosis membrane 613 and supplies the concentrated draw solution 624 and processes the dilute draw solution 626.

In various embodiments where the selective membrane unit 656 is a cation selective membrane unit, the unit 656 is used to remove hardness ions, for example, calcium, magnesium, barium, and strontium, from the feed solution 620. These various hardness ions have the tendency to precipitate in desalination systems, causing fouling and scaling, which is detrimental to the desalination process. The softened feed solution 620' is directed to one side of the membrane 613 of the forward osmosis unit 612. In one or more embodiments, the initial feed solution 620 can be processed by a first treatment unit 614A and/or the softened feed solution 620' can be further treated in a second treatment unit 614B prior to introduction to the forward osmosis unit 612. Typically, the cation selective membrane unit 656 uses a concentrated feed 622 from the forward osmosis unit 612 on the opposite side of the membrane 545 as the initial feed 620 for the exchange of hardness ions, as discussed in more detail with respect to FIG. 6A. However, because each unit 612, 656 relies on the other for a "feed" stream, one or both of the units 612, 656 will typically need to be primed.

Generally, the system 610 includes the by-pass circuit 611, including the valves 623A, 623B and line 621 necessary for providing the feed solution, either directly as a raw feed or indirectly after processing by one of the treatment units 614, to the forward osmosis unit 612. The by-pass circuit 611 can include any number and arrangement of valves and lines as necessary to suit a particular application and may even include one or more treatment units 614 as necessary. The by-pass circuit 611 allows the system 610 to begin producing the concentrated feed 622 needed for the cation selective membrane unit 656 to soften the feed 620. Alternatively, the feed 620 may be sent directly through unit 656 without processing therein to initially prime the forward osmosis unit 612. In yet another possible embodiment, the by-pass circuit 611 can include a port or other means for introducing an alternative feed to the forward osmosis unit 612.

Additionally or alternatively, the system 610 can include a priming system 619 that can provide a priming solution (e.g., brine) to the cation selective membrane unit 656 to soften the initial feed to the forward osmosis unit 612. The priming system 619 includes one or more valves 623C and one or more inlet(s) 625 (or other means) for introducing the priming solution to the system 610. Once the system 610 reaches a steady state, the supply of priming solution can be turned off. The system valve(s) 623C can also be used to redirect the concentrated feed 622 to, for example, by-pass the cation selective membrane unit 656 or discharge the concentrated feed 622. In one or more embodiments, the system 610 can include a post-treatment unit 616 to further process the concentrated feed 622 before directing it to the cation selective membrane unit 656 or discharging.

Figure 6A:
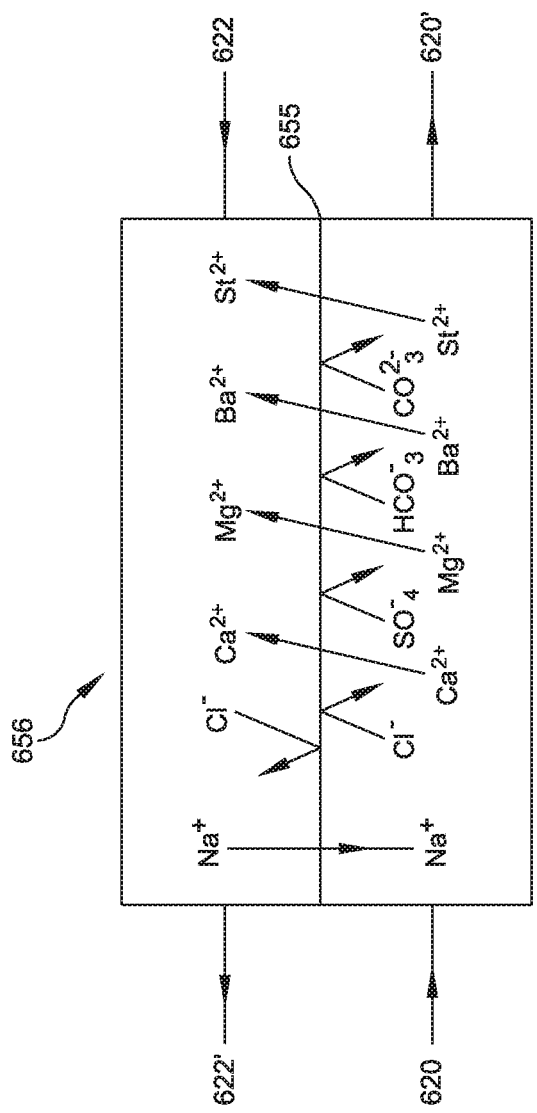
FIG. 6A is a detailed schematic representation of the selective membrane unit of FIG. 6.

The operation of the cation selective membrane unit 656 is shown in FIG. 6A with respect to one possible embodiment where the feed is a source of brine. As shown in FIG. 6A, the brine feed 620 is introduced on one side of the cation selective membrane 655 of the unit 656. The feed 620 includes sodium ions (Na+) and chloride ions (Cl−), along with the various hardness ions, such as calcium (Ca2+), magnesium (Mg2+), barium (Ba2+), and strontium (St2+). The concentrated brine 622 from the forward osmosis unit 612 (or other source) is introduced to the other side of the cation selective membrane 655. The chemical activity difference for the positive sodium ions (Na+) across the membrane 655 drives the sodium ions across the membrane 655 from the brine 622 to the feed 620. The electro-selectivity results in the passage of the positively charged hardness ions (e.g., Ca2+, Mg2+, Ba2+, and St2+) across the membrane 655 from the feed 620 to the brine 622. Because the membrane 655 is cation selective, the negatively charged ions (e.g., Cl−, SO4−, HCO3−, and CO3−) do not pass through the membrane 655, thereby resulting in a softened feed 620' for directing to the forward osmosis unit 612. The concentrated or heavy brine 622' that now contains the hardness ions can be sent for further processing or discarded.

FIG. 7 depicts an alternative osmotic system 710 that utilizes one or more forward osmosis modules 712a, 712b, 712"n" (generally 712, where "n" represents a virtually unlimited number of modules as may be included in any particular embodiment of the system 710), which can be arranged in series or parallel. As shown in FIG. 7, the forward osmosis modules 712 are arranged in series with a separation/recycling system 730 and an osmotic back-flushing system 750 for cleaning the membranes 713a, 713b, 713n (again, generally 713, where n represents some corresponding number of membranes). Generally, the forward osmosis modules 712 are configured and work similarly to those previously described. In addition, the separation/recycling system 730 is similar to those previously described. Only one separation/recycling system 730 is depicted; however, multiple systems 730 may be used to suit a particular application (e.g., a single system 730 sized and plumbed for each forward osmosis module 712 or for multiple systems/ stages in series or parallel). The back-flushing system 750 generally includes a source 755 of back-flushing solution 751, a fluid transfer device (e.g., a pump) 753, a series of valves 757, 759, 765, 767, 769, sensors 761 (with or without visual indicators, such as gauges or status lights), and associated plumbing to carry out the back-flushing and associated processes, as described in greater detail below. It is noted that not all of the valves and other components may need to be separately plumbed, as any number/combination of valves or other components can incorporated into one or more manifold assemblies.

The operation of the basic system 710 proceeds as follows: A feed stream 720 is introduced into the first forward osmosis module 712a that is divided into a first chamber or side 712' and a second chamber/side 712" by a semipermeable membrane 713a. The feed stream 720 is directed to each successive forward osmosis module 712a, 712b, and 712n and exits the last module 712n as a concentrated feed stream 722. The specific number and arrangement of forward osmosis modules 712 will be selected to suit a particular application (e.g., starting concentration and required final concentration of the feed stream, flux and flow rates, etc.) and can include any number of modules arranged in series and/or parallel. For example, multiple parallel pairs of forward osmosis modules may be arranged in series. In the embodiment shown in FIG. 7, a concentrated draw solution 724 is introduced to the last module 712n in the series of forward osmosis modules 712 and to the opposite side of the membrane 713n as the feed stream 720, thereby providing a cross-flow between the feed stream 720 and the draw solution 724, as the draw solution 720 is directed through the successive modules 712. However, the concentrated draw solution 724 could be first introduced into the same module 712a as the feed stream 720 is first introduced and/or could be introduced into multiple stages concurrently (i.e., in parallel) to suit a particular application. In addition, the various streams/solutions can be adjusted/divided as necessary to achieve an optimum differential osmotic pressure as necessary to maintain the desired flux across the membranes 713.

The feed stream 720 becomes more concentrated as it passes through each forward osmosis module 712, with the afore-mentioned concentrated feed stream 722 being discharged from the final forward osmosis module 712n. The concentrated draw solution 724 becomes diluted as it passes through each successive forward osmosis module 712 due to the passage of solvent across the membranes 713 from the feed stream into the draw solution; discharging a dilute draw solution 726 from the "first" forward osmosis module 712a. Typically, the concentrated feed stream 722 is discarded or sent for further processing, while the dilute draw solution 726 is directed to the separation/recycling system 730 to recover draw solutes/re-concentrate the draw solution and recover product solvent (e.g., water) 732. Alternatively or additionally, a portion of the more concentrated feed stream exiting each forward osmosis module 712 can be redirected back to and combined with the initial feed stream 720 or directed to a subsequent forward osmosis module 712 as necessary to maintain an optimum differential osmotic pressure across the membranes 713. For example, if the feed stream directed to a subsequent module 712 is too concentrated, such that the differential osmotic pressure across the membrane 713 is so small that an unacceptable drop in flux occurs, a portion of the less concentrated feed exiting an earlier module 712 can be combined with the feed entering the subsequent module via, for example, the appropriate actuation of valves 767b-767n.

As previously described, the osmotic back-flushing system 750 will include a source 755 of flushing solution 751 that is in fluid communication with one or more of the forward osmosis modules 712 via one or more valves 757, 759, 765, 767. In some embodiments, the flushing solution 751 is water (e.g., the product solvent 732 or other low salinity solution); however, other fluids are contemplated and considered within the scope of the invention, such as, for example, a dilute version of the draw solution (e.g., a dilute draw solution exiting one of the other modules that may be directed to a module undergoing back-flushing) or an application specific solution chemistry (e.g., a solution that is chemically compatible with one or more aspects of the system and/or may have additional beneficial effects when fluxed into the feed stream), as long as the solution has an osmotic pressure less than the feed stream so that flux is generated from the draw side 712' to the feed side 712" of the membrane 713. In some embodiments, the flushing solution 751 includes an additive, such as an acid, chelator, or surfactant that can reverse flux through the membrane to reduce/eliminate fouling on the active layer of the membrane. Examples of such additives include: citric acid, sulfuric acid, hydrochloric acid, ethylenediaminetetraacetic acid (EDTA) and other low molecular weight substances. In additional embodiments, the temperature of the flushing solution 751 can be varied to suit a particular application, for example, the temperature of the flushing solution can be increased to assist with the reverse fluxing of an additive through the membrane. In one or more embodiments, the flushing solution 751 is stored within a tank 755 as part of the overall system 710; however, it may also be supplied from an external source via, for example, a port 763b and valve 759b arrangement. The valves 757, 759, 765, 767, 769 can be essentially any combination of shut-off and directional valves and will typically be multi-directional valves that can control multiple streams between the various systems 730, 750 and modules 712, as are well-known in the industry.

Generally, the back-flushing system 750 can be operated as needed (for example, via manual initiation or as triggered by a signal representing a change in one or more performance characteristics of the system 710) or at specific intervals depending, for example, on a protocol that takes into consideration the nature/chemistry of the feed streams 720, 722 and/or draw solutions 724, 726, the operating conditions (e.g., temperature, flow rates, flux, pressures, etc.), presence or absence of pretreatment, and combinations thereof. For example, the back-flushing system 750 can programmed to flush all of the modules 712 in a single operation at, for example, three (3) hour intervals, or other application specific interval, for example a more frequent interval may be preferable where the feed stream 720 has a high likelihood of fouling the membranes 713. Other intervals can include, for example, every 48 hours or every six hours during a first period of operation and shorter or longer intervals for subsequent periods of operations. Also, the duration of the osmotic back-flushing procedure can be selected to suit a particular application. Alternatively or additionally, the back-flushing system 750 could flush individual modules 712 as necessary based on one or more signals generated by one or more sensors 761 located up- and/or downstream of a module 712. In some embodiments, the system may operate an osmotic back-flushing procedure on individual modules, each having a unique protocol. For example, each module could be flushed every six to 24 hours on a staggered schedule, such as the first module is flushed every 12 hours, a second module is flushed two hours after the first module and every 12 hours, a third module is flushed two hours later and also every 12 hours, etc. The flush duration for the modules can be substantially the same or can vary to suit a particular application. For example, the last module downstream of the feed inlet may be subjected to greater fouling since it is exposed to the most concentrated feed, as such it may need to be flushed for a longer duration or, in some cases, also or alternatively more frequently than the other modules. Essentially any combination of flushing intervals and durations are possible to suit a particular application, as may be defined by the number of modules, the feed and draw solution chemistries, ambient conditions, membrane materials, etc.

When it is determined that a back-flushing procedure is necessary, either based on a predetermined protocol or the measurement of a change in a system performance characteristic (e.g., a drop in flux, which is typically continuously monitored), one or more of the valves may be actuated (manually or electronically by a control system) to redirect the flow pathways of the various streams/solutions. Generally, in a normal operation according to one or more embodiments of the invention, valves 757a, 757b, and 757d are positioned to allow for the direct flow of concentrated draw solution 724 into the forward osmosis modules 712 (either from the separation/recycling system 730 or as otherwise introduced to the system 710, for example via port 763b and valve 759b arrangement) and the discharge of dilute draw solution 726 from the forward osmosis modules 712 to the separation/recycling system 730. Additional valves (e.g., flow control or pressure relief type) and sensors 761 may be present to further monitor and control the various systems and flows therebetween. For example, the system 710 may include an additional port 763a and valve 759a arrangement in the line that carries the dilute draw solution 726 to the separation/recycling system 730 that can be used as, for example, a blow down to remove excess and/or undesirable solutes (e.g., solutes that passed through the membrane 713 from the feed stream 720) from within the dilute draw solution 726, as is well-known in the industry. Alternatively or additionally, the port 763a and valve 759a arrangement can be used to introduce additional chemicals and/or make-up draw solution to the system 710, for example, disodium phosphate may be added to the dilute draw solution 726 to adjust the pH thereof. In one or more embodiments, the port 763b and valve 759b arrangement can be used to introduce additional chemicals and/or prime the system 710 with an initial or make-up source of concentrated draw solution 724.

To begin the back-flushing procedure, at least valve 757d is actuated to stop the flow of concentrated draw solution 724 to the forward osmosis modules 712 and introduce the flushing solution 751 from the back-flushing system 750 to the draw sides 712' of the forward osmosis modules 712. Alternatively, valve 757d may be actuated to significantly reduce the flow of concentrated draw solution 724 and meter in a portion thereof into the flushing solution 751 depending on the nature of the flushing solution to, for example, customize the flushing solution 751 being introduced into any given module 712. Typically, the flushing solution 751 is introduced into the forward osmosis modules 712 in series; however, the flushing solution 751 can be introduced into the modules 712 in parallel or singularly via the appropriate combination and actuation of valves 757, 759, 765, 767, 769. For example, valve 757c can be actuated to direct the flushing solution to an entire series of modules or portion the flushing solution 751 between multiple modules 712. In one embodiment, the osmotic back-flushing procedure is carried out on a single module/stage at a time (the module can be isolated from the remaining modules via actuation of the appropriate valves), while the other modules/stages continue to operate normally, thereby maintaining the steady state operation of the overall system. Additional valve arrangements can be used to blend the flushing solution 751 with other streams/solutions to suit a particular application. In one example, the dilute draw solution 726 can be used as the flushing solution by redirecting the solution 724 to the modules 712 via valves 757, 759, 765. Because the flushing solution 751 has a lower concentration of solutes (or essentially no solutes in the case of deionized water), i.e., a lower osmotic potential, solvent will flow from the draw side 712' of a module 712, across the membrane 713, and into the feed side 712" (i.e., into the feed stream 720), thereby removing at least a portion of any scale or other fouling matter that may have settled on the feed side 712" of the membrane 713. The duration of the back-flushing procedure will vary to suit a particular application and may last from 1 minute to 60 minutes, preferably from 5 minutes to 45 minutes and more preferably from 10 minutes to 20 minutes. Generally, the duration of the procedure will be selected to remove a substantial portion or all of the scale/fouling matter that has adhered to the membrane with a minimum amount of down time (e.g., a time when the feed stream 720 is not being concentrated). In one exemplary embodiment, the osmotic back-flush runs for about 15 minutes every 48 hours. In yet another embodiment, the osmotic back flush runs for about 5-10 minutes every 1-2 hours. In addition, the flow rate of the feed stream or the draw solution through a module 712 can be varied during a flushing procedure. For example, the flow rate of the feed stream 720 (the draw stream during a back-flush procedure) can be increased to, for example, increase the shear forces on any fouling/scaling that has formed on the membrane surface. The increased flow rate can also result in a higher flux rate during the osmotic back-flush, further assisting in the cleaning of the membrane. Additionally, the system 710 can include recirculation circuits 771a, 771b, 771n on each of the forward osmosis modules 712. The circuits 771 can include a pump (or other pressure exchange device) and any osmosis module 712. In one embodiment, the osmotic back-flush protocol includes operating the recirculation circuit 771 to assist with the cleaning of the membrane by, for example, varying (e.g., increasing) the flow rate through the module 712 and/or reversing the flow direction of at least a portion of the feed stream. Again, the specific flushing protocol will be selected to suit a particular application. The nature of the feed stream's chemistry, the target flux, operating pressures, and/or temperatures, among other operating parameters may all factor in to determining the appropriate osmotic back-flushing procedure (e.g., interval, duration, solution chemistry, etc.).

The "used" flushing solution 751' that exits the module(s) 712 may be directed to the separation/recycling system 730, recirculated back through one or more modules 712, or returned to the back-flushing system 750 via the appropriate actuation of valves 757, 759, 765, 769, depending on the nature of the flushing solution 751. In one or more embodiments, the flushing solution 751' is removed via the port 763a and valve 759a arrangement and discarded, returned to the back-flushing system 750, added to the feed stream 720, or sent elsewhere for processing. The now diluted feed stream 722' can be recirculated back to the initial feed stream 720 or discarded/sent for further processing with the concentrated feed 722 via, for example, actuation of at least valve 757e.

Generally, when operating the modules 712 in a series arrangement, it is usually desirable to operate with a cross-flow of the feed stream 720 and the draw solution 724, as shown in FIG. 7 and described above, so that the feed stream concentration increases as it flows through the modules 712 and the draw solution concentration decreases as it flows through the modules 712. The cross-flow orientation of the feed stream and draw solution can be considered perpendicular in this embodiment; however, in other embodiments, the cross flow of the feed stream and draw solution may also be tangential, as opposed to just parallel or perpendicular. This arrangement results in the least concentrated feed stream opposing the least concentrated draw solution across the membrane 713*a* in module 712*a* and the most concentrated feed stream opposing the most concentrated draw solution across membrane 713*n* in module 712*n*. This results in an optimum differential osmotic pressure across all of the modules 712. However, in some embodiments, it may be desirable to alter the differential osmotic pressure across one or more of the forward osmosis modules 712 to increase flux across that or a later/subsequent (as determined by draw solution flow direction) forward osmosis module 712 to increase solvent recovery/removal from the feed stream 720. In one or more embodiments, this can be achieved by using at least a portion of the back-flushing system 750 to introduce portion(s) of one or more other solutions to a particular module 712, thereby altering the differential osmotic pressure across any particular membrane 713.

In one such example, a portion of concentrated (or at least more concentrated depending on the source) draw solution 724 may be added to the partially diluted draw solution being introduced into a subsequent forward osmosis module 712 during an otherwise typical operation, which can result in additional flux across the membrane (i.e., greater solvent recovery). This can be accomplished by actuating valve 757*b* and one or more of valves 759*c*, 759*n*, 765 depending on the number of modules 712 in the system, their arrangement, and which module's flux rate is targeted for modification. For example, in one or more embodiments, valve 757*b* can be used to meter portions of concentrated draw solution 724 to multiple modules 712, so as not to disrupt the flow of concentrated draw solution to any particular module 712. Alternatively, different combinations of valves 757, 759, 765, 769 can be actuated to introduce a portion of dilute draw solution 726, either alone or blended with a portion of concentrated draw solution 724, to the partially diluted draw solution directed to any particular module 712, thereby resulting in the introduction of a draw solution having a customized concentration to any particular module 712 to suit a particular application. One such application can include a situation where the feed stream concentration varies, such that the draw solution concentration needs to be varied to maintain a relatively constant flux rate across all of the modules 712. In such an embodiment, a variety of sensors 761 can be used to monitor different characteristics of the feed streams 720, 722 and draw solutions 724, 726 (e.g., concentration level via a conductivity sensor) and trigger the actuation of the appropriate valves 757, 759, 765, 767, 769 as necessary to modify the draw solution concentration to one or more of the modules 712.

Figure 8A:
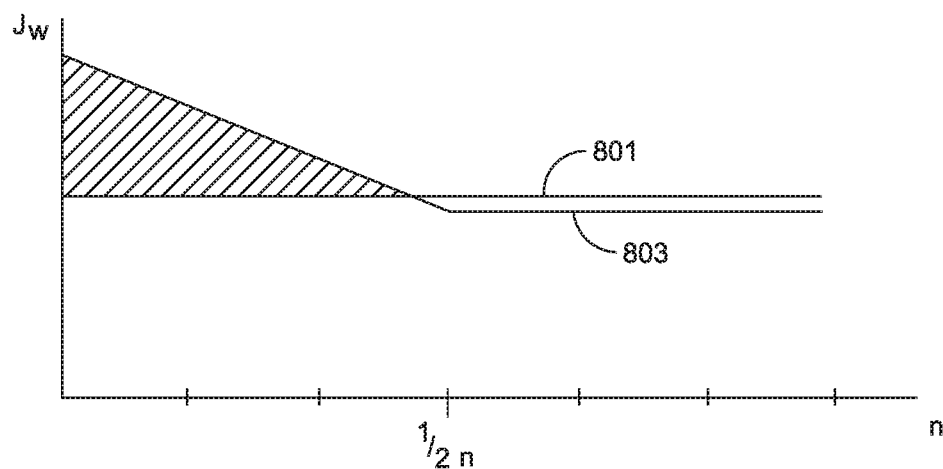
FIGS. 8A and 8B are graphical representations of the additional solvent recovery possible with the alternative osmotic system of FIG. 7 operated in accordance with one or more embodiments of the invention.
Figure 8B:
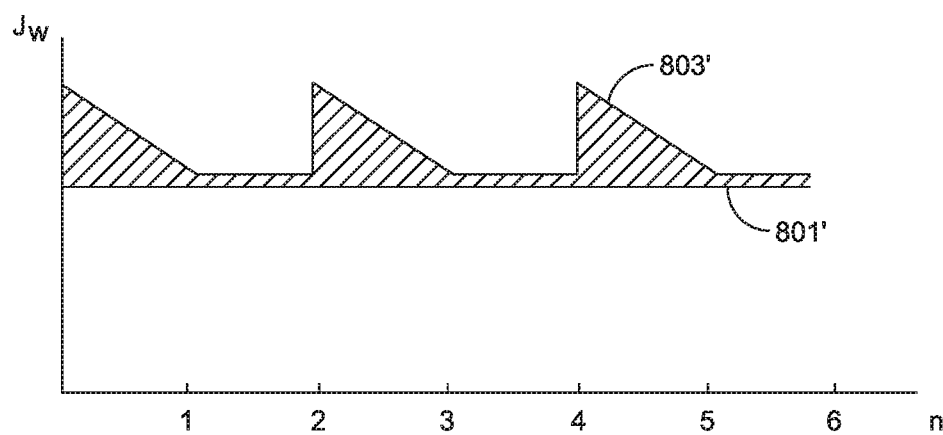

The graphs in FIGS. 8A and 8B illustrate the potential for increased solvent recovery from the subsequent forward osmosis modules 712 (i.e., the earlier module relative to the feed stream flow direction, which is also where the feed stream is less concentrated) when operating in accordance with one or more of the preceding examples. As shown in FIGS. 8A and 8B, lines 801/801' represent average flux for the system 710 under normal operation, while lines 803/803' represent the average flux for the system 710 utilizing the osmotic back-flushing system 750 as a partial by-pass of the concentrated draw solution, with relative flux (JW) plotted on the ordinate and the number of modules (n) plotted on the abscissa.

In the specific example plotted in FIG. 8A, the system 710 includes 6 forward osmosis modules 712 and a portion of concentrated draw solution 724 is by-passed to the last three modules (i.e., 712*d*, 712*e*, 712*0* ("½ n"); however, the system 710 may include any number of forward osmosis modules 712 and the concentrated draw solution 724 can be by-passed to any number of modules in any order. Generally, the introduction of additional concentrated draw solution to the partially diluted draw solution entering any subsequent module 712 increases the differential osmotic pressure with respect to that module 712, which results in an increased flux across the associated membrane 713 (i.e., additional solvent recovered).

As can be seen in FIG. 8A, the non-modified differential osmotic pressure (i.e., normal operation) results in a fairly constant flux rate through the plurality of serial forward osmosis membranes, while with the modified differential osmotic pressure, there is an initial increase in system flux (specifically in the modules 712*d*, 712*e*, 712*0* that eventually returns to "normal" in the later modules 712*a*, 712*b*, 712*c*. As represented by FIG. 8B, portions of the concentrated draw solution 724 are introduced to alternate modules 712 (e.g., 712*f*, 712*d*, 712*b*), thereby resulting in alternating increases in module flux for an overall increase in the average system flux.

Furthermore, the back-flushing system 750 or portions thereof may also be used to control other operations of the overall system 710 and/or run alternative back-flushing protocols. For example, in some embodiments, the differential osmotic pressure between the draw and feed sides 712', 712" of the membrane 713 may be so great that the membrane may be at risk of delamination and/or blistering. In that situation, various valves and lines of the back-flushing system can be used to divert and/or blend different streams/solutions. For example, during a back-flushing procedure, a portion of dilute and/or concentrated draw solution 724, 726 may be blended with the flushing solution 751 to achieve a suitable osmotic potential thereof, and by extension, the optimum differential osmotic pressure between the opposing sides of the membrane 713. In some cases, for example where the feed stream 720 is first introduced and at its most concentrated during the back-flushing procedure (module 712*a* in FIG. 7), valve 757*a* and/or valve 757*b*, along with valve 759*b* and possibly valve 765 (depending on which solution is to be introduced), may be actuated to introduce a portion of draw solution into the flushing solution 751 introduced to forward osmosis module 712*a*, thereby reducing the differential osmotic pressure across the membrane 713*a*. Other portions/concentrations of draw solution can be added to the other forward osmosis modules 712*a*, 712*n*, as necessary to obtain an optimum differential osmotic pressure across the membranes 713 by actuating the appropriate valves 757, 759, 765, 767, 769 depending on the number of forward osmosis modules 712 used in any particular embodiment of the system 710.

Figure 9:
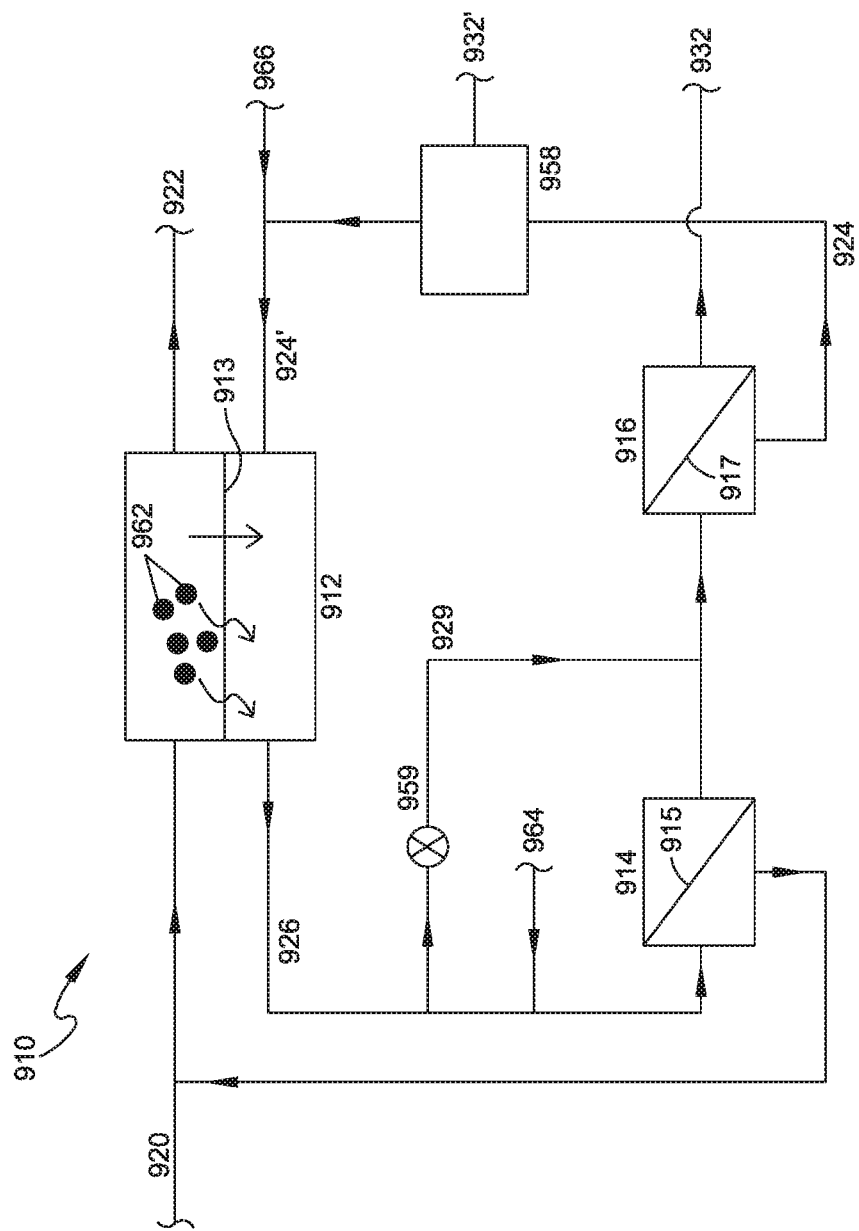
FIG. 9 is a schematic representation of an alternative osmotic system in accordance with one or more embodiments of the invention.

FIG. 9 is a simplified schematic representation of another alternative system 910 for the extraction of a solvent. This system 910 uses one or more forward osmosis units 912 (e.g., multiple units arranged in series and/or parallel to suit a particular application) and a separation system 930 that incorporates one or more of a nanofiltration/ultrafiltration unit 914, a reverse osmosis unit 916, and a membrane distillation unit 958, all in various states of fluid communication. The system 910 is similar to those previously disclosed, for example, the various osmotic/filtration units 912, 914, 916 include membranes 913, 915, 917 as previously described, and the system 910 also includes all of the necessary valves, pumps, piping, sensors, controls, etc. to suit a particular application. In one embodiment, the system 910 is configured for an application where the feed stream includes certain solutes that may be disposed to selective permeation through the membrane 913 and/or would otherwise require pretreatment. In some embodiments, the membrane(s) may have high selective permeability properties, thereby allowing these solutes to pass through the membrane(s) 913; however alternative types of membranes may be used to maximize performance of the system 910 for a particular application, for example, feed chemistry, draw solution chemistry, ambient conditions, etc.

As shown in FIG. 9, a feed solution 920 is directed to one side of the membrane 913 of the forward osmosis unit 912, while a concentrated draw solution 924' is directed to the other side of the membrane 913. A diluted draw solution 926 exits the forward osmosis unit 912 and is directed to the separation system 930, while the concentrated feed solution 922 exits the forward osmosis unit 912, where it can be used as is, sent for further processing, or otherwise discarded. In some cases, the concentrated feed solution 922 contains one or more desirable constituents, such as a food or pharmaceutical product.

Generally, the separation system 930 includes the nanofiltration (NF) or ultrafiltration (UF) unit 914 for initially treating at least a portion of the dilute draw solution 926 and the reverse osmosis unit 916 for treating the dilute draw solution 926' processed by the NF/UF unit 914, the dilute draw solution 926 directly outputted by the forward osmosis unit 912, or both. The system 930 may optionally include a membrane distillation unit 958 or other thermal recovery system as previously described herein for additional concentration of the draw solution and/or to recover additional product water, as discussed in greater detail below. In one or more embodiments, the dilute draw solution 926 may include one or more solutes 962 that have selectively permeated across the membrane 913, such as calcium ions (Ca2+), magnesium ions (Mg2+) or various sulfates, sulfonates, or generally other sparingly soluble inorganic solutes or organic constituents. At least a portion of the dilute draw solution 926 (including the permeated solutes) can be directed to the NF/UF unit 914. In some embodiments, all or a portion of the dilute draw solution can by-pass the NF/UF unit 914 via by-pass line 929 and valve arrangement 959 and be sent directly to the reverse osmosis unit 916, depending, in part, on the condition/chemistry of the dilute draw solution 926. In some embodiments, the by-pass valve arrangement 959 can include a three-way valve that can meter portions of the dilute draw solution 926 to the NF/UF unit 914 and/or the reverse osmosis unit 916. Alternatively, multiple valves can be used to selectively direct the dilute draw solution 926, or portions thereof, to the appropriate treatment process.

Typically, the NF/UF membrane 915 will be a "loose" NF membrane (or possibly a "tight" UF membrane) that allows at least a substantial portion of the draw solutes (e.g., NaCl) to pass there through, while blocking at least a substantial portion of the permeated solutes 962. Generally, a membrane 915 with a rejection rate of only about 30% is acceptable (e.g., a 0%-20% rejection if NaCl draw solutes are used is preferable), although what is considered a desirable rejection rate will vary depending on the various system conditions, for example, solution chemistries, operating parameters, and ambient conditions. In one or more embodiments, draw solutes comprising monovalent compounds, such as NaCl, pass more readily through the NF membrane 915 where they can be concentrated in the reverse osmosis unit 916 for use as the concentrated draw solution 924, while the divalent or polyprotic compounds, such as Ca2+, sulfates, or organic compounds are rejected by the membrane 915 and returned to the feed stream 920. These solutes 962 can be directed to the system feed 920 via line 968, which may include any necessary pumps, valves, controls, etc. to return the solutes 962 to the feed 920. In one or more embodiments, only about 10% of the dilute draw solution 926 is directed to the NF/UF unit 914, which acts similar to a solute blow-down process to remove at least a portion of undesirable solutes that may build up in the draw solution and/or assist with the balancing of ions between the feed and draw sides 912a, 912b of the forward osmosis unit(s) 912, thereby eliminating the need for a separate blow-down circuit.

Additionally, the separation system 930/by-pass circuit (929, 959) may include means 964 (e.g., a port and valve arrangement, with or without a tank, metering/mixing device, etc.) for introducing one or more additives to the dilute draw solution 926 prior to processing. In some embodiments, a dispersant (e.g., sodium lignin sulfonate) may be added to the dilute draw solution 926 prior to the NF/UF unit 914 to facilitate the introduction of the additive to the feed stream 920, as at least a substantial portion of the additive will be rejected by the NF/UF membrane allowing it to be returned to the feed with the undesirable solutes 962. In some embodiments, the additive can reduce or eliminate fouling or scaling of the NF/UF membrane prior to be directed to the feed stream 920. Alternatively or additionally, the introduction means 964 can be used to introduce other additives (e.g., anti-scalants, corrosion inhibitors, complexing agents, dispensing agents, sequestrants, sludge conditioners, or sludge inhibitors) to other areas of the system 910. For example, the system 910 may include similar means 966 for introducing additional draw solutes to the draw solution. In some embodiments, these means 966 include a brine maker (e.g., where the main draw solute is NaCl) to replace any solutes that may have reverse fluxed through the membrane 913 or otherwise have been lost in the draw solution recovery process. These means 966 will typically be disposed proximate to where the concentrated draw solution is introduced to the forward osmosis unit(s) 912; however, other locations are possible to suit a particular application.

The diluted draw solution 926, 926' is pressurized in the reverse osmosis unit 916 (e.g., via pump 953 or other pressure exchanger) forcing solvent through the membrane 917. This product solvent 932 can be removed from the reverse osmosis unit 916 as, for example, product water that can be used as is, be disposed of, sent for further processing, or employed as a heat transfer fluid within an integrated system. The draw solution that remains on the first side 916A of the reverse osmosis unit 916 is now concentrated draw solution 924 and can be sent back to the forward osmosis unit 912 as is, or sent for further processing to further concentrate the draw solution and/or recover additional product solvent, as necessary to suit a particular application. As shown in FIG. 9, the concentrated draw solution 924 exiting the reverse osmosis unit 916 is directed to the optional membrane distillation unit 958 for further concentration, producing additional product water 932' and a more concentrated draw solution 926'.

In accordance with one or more embodiments, the devices, systems and methods described herein may generally include a controller for adjusting or regulating at least one operating parameter of the device or a component of the systems, such as, but not limited to, actuating valves and pumps, as well as adjusting a property or characteristic of one or more fluid flow streams through an osmotically driven membrane module, or other module in a particular system. A controller may be in electronic communication with at least one sensor configured to detect at least one operational parameter of the system, such as a concentration, flow rate, pH level, or temperature. The controller may be generally configured to generate a control signal to adjust one or more operational parameters in response to a signal generated by a sensor. For example, the controller can be configured to receive a representation of a condition, property, or state of any stream, component, or subsystem of the osmotically driven membrane systems and associated pre- and post-treatment systems. The controller typically includes an algorithm that facilitates generation of at least one output signal that is typically based on one or more of any of the representation and a target or desired value such as a set point. In accordance with one or more particular aspects, the controller can be configured to receive a representation of any measured property of any stream, and generate a control, drive or output signal to any of the system components, to reduce any deviation of the measured property from a target value.

In accordance with one or more embodiments, process control systems and methods may monitor various concentration levels, such as may be based on detected parameters including pH and conductivity. Process stream flow rates and tank levels may also be controlled. Temperature and pressure may be monitored. Membrane leaks may be detected using ion selective probes, pH meters, tank levels, and stream flow rates. Leaks may also be detected by pressurizing a draw solution side of a membrane with gas and using ultrasonic detectors and/or visual observation of leaks at a feedwater side. Other operational parameters and maintenance issues may be monitored. Various process efficiencies may be monitored, such as by measuring product water flow rate and quality, heat flow and electrical energy consumption. Cleaning protocols for biological fouling mitigation may be controlled such as by measuring flux decline as determined by flow rates of feed and draw solutions at specific points in a membrane system. A sensor on a brine stream may indicate when treatment is needed, such as with distillation, ion exchange, breakpoint chlorination or like protocols. This may be done with pH, ion selective probes, Fourier Transform Infrared Spectrometry (FTIR), or other means of sensing draw solute concentrations. A draw solution condition may be monitored and tracked for makeup addition and/or replacement of solutes. Likewise, product water quality may be monitored by conventional means or with a probe such as an ammonium or ammonia probe. FTIR may be implemented to detect species present providing information which may be useful to, for example, ensure proper plant operation, and for identifying behavior such as membrane ion exchange effects.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

What is claimed is:

1. A system for osmotic extraction of a solvent from a first solution, comprising:
   (a) a reverse osmosis unit comprising:
      a first chamber of the reverse osmosis unit in fluid communication with a source of the first solution;
      a semi-permeable membrane of the reverse osmosis unit coupled to the first chamber of the reverse osmosis unit; and
      a second chamber of the reverse osmosis unit coupled to the semi-permeable membrane of the reverse osmosis unit and configured for receiving a first portion of the solvent fluxed through the semi-permeable membrane of the reverse osmosis unit, thereby leaving a concentrated first solution in the first chamber of the reverse osmosis unit; and
   (b) a first forward osmosis unit fluidly coupled to the reverse osmosis unit and comprising:
      a first chamber of the first forward osmosis unit having an inlet in fluid communication with the first chamber of the reverse osmosis unit and configured for receiving the concentrated first solution;
      a second chamber of the first forward osmosis unit having an inlet fluidly coupled to a source of a concentrated draw solution; and
      a semi-permeable membrane of the first forward osmosis unit separating the first chamber of the first forward osmosis unit from the second chamber of the first forward osmosis unit and configured for osmotically separating a second portion of the solvent from the concentrated first solution, thereby forming a further concentrated first solution in the first chamber of the first forward osmosis unit and a dilute draw solution in the second chamber of the first forward osmosis unit;
   (c) a separation system in fluid communication with the first forward osmosis unit and configured to separate the dilute draw solution into the concentrated draw solution and a solvent stream, the separation system comprising:
      an inlet fluidly coupled to an outlet of the second chamber of the first forward osmosis unit for receiving the dilute draw solution therefrom; and
      an outlet fluidly coupled to the second chamber of the first forward osmosis unit for introducing the concentrated draw solution to the first forward osmosis unit; and
   (d) a second forward osmosis unit in fluid communication with the first forward osmosis unit and comprising:

a first chamber of the second forward osmosis unit having an inlet fluidly coupled to an outlet of the first chamber of the first forward osmosis unit and configured for receiving the further concentrated first solution from the first forward osmosis unit;

a second chamber of the second forward osmosis unit having an inlet fluidly connected to a source of a feed solution; and a semi-permeable membrane of the second forward osmosis unit separating the first chamber of the second forward osmosis unit from the second chamber of the second forward osmosis unit and configured for osmotically separating a solvent from the feed solution, thereby diluting the concentrated first solution in the first chamber of the second forward osmosis unit and concentrating the feed solution in the second chamber of the second forward osmosis unit, wherein the system for osmotic extraction of a solvent from a first solution further comprises a by-pass system in fluid communication with the reverse osmosis unit and the second forward osmosis unit and configured to return the diluted first solution from the outlet of the first chamber of the second forward osmosis unit to the inlet of the first chamber of the reverse osmosis unit.

2. The system of claim 1, wherein the second forward osmosis unit is a pressure retarded osmosis unit.

3. The system of claim 2 further comprising a turbine in fluid communication with the first chamber of the second forward osmosis unit and configured for receiving the diluted first solution.

4. The system of claim 1, wherein the feed solution comprises a wastewater effluent stream.

5. A system for osmotic extraction of a solvent from a first solution, comprising:

(a) a selective membrane unit for conditioning the first solution, the unit comprising:

a first chamber of the selective membrane unit having an inlet fluidly coupled to a source of the first solution;

a second chamber of the selective membrane unit having an inlet fluidly coupled to a source of a second solution; and a selective membrane of the selective membrane unit separating the first chamber of the selective membrane unit from the second chamber of the selective membrane unit and configured to selectively allow certain ions within at least the first solution to pass from the first solution to the second solution, wherein the selective membrane is a cation selective membrane;

(b) a forward osmosis unit in fluid communication with the selective membrane unit and comprising:

a first chamber of the forward osmosis unit having an inlet fluidly coupled to at least one of the source of the first solution or an outlet of the first chamber of the selective membrane unit for receiving the conditioned first solution;

a second chamber of the forward osmosis unit having an inlet fluidly coupled to a source of a concentrated draw solution; and a semi-permeable membrane of the forward osmosis unit separating the first chamber of the forward osmosis unit from the second chamber of the forward osmosis unit and configured for osmotically separating the solvent from the first solution, thereby forming the source of the second solution in the first chamber of the forward osmosis unit and a dilute draw solution in the second chamber of the forward osmosis unit;

(c) a separation system in fluid communication with the forward osmosis unit and configured to separate the dilute draw solution into the concentrated draw solution and a solvent stream, the separation system comprising:

an inlet fluidly coupled to an outlet of the second chamber of the forward osmosis unit for receiving the dilute draw solution therefrom; and an outlet fluidly coupled to the second chamber of the forward osmosis unit for introducing the concentrated draw solution to the forward osmosis unit; and (d) a valve arrangement in fluid communication with the first chamber of the forward osmosis unit, the second chamber of the selective membrane unit, and an alternative source of the second solution, the valve arrangement configured to direct the second solution from either the first chamber of the forward osmosis unit or the alternative source to the second chamber of the selective membrane unit.

6. The system of claim 5 further comprising a second valve arrangement in fluid communication with the source of the first solution, the selective membrane unit, and the forward osmosis unit, the second valve arrangement configured for directing the first solution to either the selective membrane unit or the forward osmosis unit or directing the conditioned first solution to the forward osmosis unit.

7. The system of claim 5 further comprising at least one treatment system in fluid communication with at least one of the selective membrane unit, the forward osmosis unit, or the separation system.

\* \* \* \* \*